(12) United States Patent
Callewaert et al.

(10) Patent No.: US 12,516,361 B2
(45) Date of Patent: Jan. 6, 2026

(54) GENETICALLY ENGINEERED EUKARYOTIC CELLS PRODUCING SIALYLATED GLYCOPROTEINS

(71) Applicants: VIB VZW, Ghent (BE); UNIVERSITEIT GENT, Ghent (BE)

(72) Inventors: Nico Callewaert, Nevele (BE); Wander Van Breedam, Antwerp (BE); Francis Santens, Brussels (BE)

(73) Assignees: Universiteit Gent, Ghent (BE); VIB VZW, Ghent (BE)

( * ) Notice: Subject to any disclaimer, the term of this patent is extended or adjusted under 35 U.S.C. 154(b) by 258 days.

(21) Appl. No.: 16/646,938

(22) PCT Filed: Sep. 13, 2018

(86) PCT No.: PCT/EP2018/074788
§ 371 (c)(1),
(2) Date: Mar. 12, 2020

(87) PCT Pub. No.: WO2019/053147
PCT Pub. Date: Mar. 21, 2019

(65) Prior Publication Data
US 2020/0277641 A1 Sep. 3, 2020

(30) Foreign Application Priority Data
Sep. 14, 2017 (GB) .................................. 1714765

(51) Int. Cl.
*C12P 21/00* (2006.01)
*C07K 16/28* (2006.01)
*C12N 5/071* (2010.01)
*C12N 9/10* (2006.01)
*C12N 9/12* (2006.01)
*C12N 9/24* (2006.01)

(52) U.S. Cl.
CPC ........ *C12P 21/005* (2013.01); *C07K 16/2887* (2013.01); *C12N 5/0602* (2013.01); *C12N 9/1051* (2013.01); *C12N 9/1205* (2013.01); *C12N 9/2402* (2013.01); *C12Y 204/01023* (2013.01); *C12Y 207/0106* (2013.01); *C12Y 302/01096* (2013.01); *C07K 2317/24* (2013.01); *C07K 2317/41* (2013.01)

(58) Field of Classification Search
CPC ............. C12P 21/005; C12Y 207/0106; C12Y 302/01096; C07K 2317/41
See application file for complete search history.

(56) References Cited

U.S. PATENT DOCUMENTS

2006/0286637 A1* 12/2006 Hamilton ............. C12N 9/1081
435/69.1

FOREIGN PATENT DOCUMENTS

| WO | 0159075 A1 | 8/2001 |
| WO | 2015032899 A1 | 3/2015 |
| WO | 2017005925 A1 | 1/2017 |

OTHER PUBLICATIONS

Kallolimath, S, et al., "Engineering of Complex Protein Sialylation in Plants," Proceedings of the National Academy of Sciences of the United States of America, vol. 113, No. 34, Jul. 21, 2016, pp. 9498-9503.
Meuris, L. et al. "GlycoDelete Engineering of Mammalian Cells Simplifies N-Glycosylation of Recombinant Proteins," Nature Biotechnology, vol. 32, No. 5, Apr. 20, 2014, pp. 485-489.
PCT International Search Report and Written Opinion; Application No. PCT/EP2018/074788 Applicant VIB VZW, International filing date of Sep. 13, 2018, date of mailing Feb. 11, 2019, 26 pages.

* cited by examiner

*Primary Examiner* — Paul J Holland
(74) *Attorney, Agent, or Firm* — Patent Law Works LLP (57) ABSTRACT

The present application provides glycosylation engineered higher eukaryotic cells which produce homogeneous forms of sialylated glycans present on a recombinant glycoprotein. In particular, the glycosylation engineered higher eukaryotic cells produce homogeneous forms of small N-glycan structures which carry terminal sialic acid residues. In addition, the invention provides glycan-conjugates based on specific coupling with sialic acid residues present on the recombinant glycoproteins.

8 Claims, 3 Drawing Sheets
Specification includes a Sequence Listing.

GENETICALLY ENGINEERED EUKARYOTIC CELLS PRODUCING SIALYLATED GLYCOPROTEINS

FIELD OF THE INVENTION

The present application relates to the field of glycosylation, more particularly to the field of glycosylation engineering. Even more particularly the invention relates to the field of engineered higher eukaryotic cells which produce homogeneous forms of sialylated N-glycans present on a recombinant glycoprotein. Accordingly, the present invention provides means and methods for the production in higher eukaryotic cells of homogeneous forms of small N-glycan structures which carry terminal sialic acid residues. In addition, the invention provides glycan-conjugates based on specific coupling with sialic acid residues present on the recombinant proteins.

Introduction to the Invention

Therapeutic proteins play an increasingly important role in the pharmaceutical industry, achieving annual total sales of ~$48 billion in 2009 (Aggarwal (2010) *Nat. Biotechn.,* 28 (11), 1165-71). Unlike in the past, therapeutic proteins are now administered to patients with a whole variety of disease conditions, sometimes in high milligram quantities per dose. They represent an integrated part of treatment for various cancer types, autoimmune diseases, and replacement therapies such as enzyme and hormone substitutes. Among the biggest blockbusters in the biopharmaceutical industry are therapeutic proteins like Erythropoietin (EPO, Epogen®; Amgen), and the chimeric IgG1 monoclonal antibody Infliximab (Remicade®; Centocor Ortho Biotech Inc.) with annual sale volumes of $2.6 and $3.2 billion each in 2009, respectively (Aggarwal (2010) *Nat. Biotechn.,* 28 (11), 1165-71). The vast majority of therapeutic proteins require posttranslational modification with N-glycans and less frequently, 0-glycans. Glycosylation is a very critical modification of therapeutic proteins, known to significantly modulate yield, bioactivity, solubility, stability against proteolysis, immunogenicity, and clearance rate from circulation. Depending on the source, the glycosylation pattern of the recombinant protein product varies greatly: starting with bacterial systems that generally do not glycosylate, followed by yeast, plants and insect cell systems generating immunogenic glycan types that are absent in humans, to mammalian systems with human-like complex glycans. Significant progress has been made over the past decade to overcome the current limitations of non-mammalian expression systems by glycoengineering approaches to achieve expression of human-like glycosylation patterns but currently, the vast majority of therapeutic glycoproteins is produced by mammalian production platforms with their natural ability to express human-like glycosylation.

Typically, for therapeutic proteins it is aimed for that the terminal position of N-linked complex glycans is occupied by sialic acid. The presence of sialic acid increases the in vivo circulatory lifetime of glycoproteins as sialic acid terminated glycans are not recognized by asialoglycoprotein receptors present on hepatocytes. Unsialylated glycoproteins are recognized by the asialoglycoprotein receptor via the exposed galactose and targeted for degradation (Weiss, P. and Ashwell, G. (1989) *Prog Clin Biol Res.* 300). In addition, the presence of negatively charged sialic acids positively impacts stability and solubility of glycoproteins (Lawson, E. Q. et al (1983) *Arch Biochem Biophys.* 1:220).

The biosynthesis of the sugar sialic acid in higher eukaryotic cells is regulated by the feedback inhibition of the key enzyme of sialic acid biosynthesis, the UDP-GlcNAc 2-epimerase/ManNAc kinase (GNE) (Kornfeld S. et al (1964) *Proc. Natl. Acad. Sci.* 52, 371). GNE is a bifunctional enzyme, which catalyzes the conversion of UDP-GlcNAc to ManNAc and the phosphorylation of ManNAc to ManNAc-6-phosphate (see FIG. 1 for a scheme of the sialic acid synthesis pathway in Bork K. et al (2007) *FEBS Letters* 581, 4195). The next step is a condensation of ManNAc-6-P and pyruvate resulting in sialic acid. Then, sialic acid is activated in the nucleus into the nucleotide donor CMP-sialic acid. CMP-sialic acid inhibits GNE in a feedback dependent manner (Gu X and Wang D I (1988) *Biotechnol. Bioeng.* 58, 642).

Considering the influence of sialic acid on the properties of glycoproteins, it is particularly desirable to develop approaches allowing for enhanced sialylation of recombinant glycoproteins combined with a maximal yield and preferably having a homogeneous glycan structure. Therefore, several approaches have been disclosed in the art to enhance the sialylation of glycoproteins for pharmaceutical use. For example, since it has been suggested that insufficient concentration of CMP-sialic acid inside the trans-Golgi is the major cause for incomplete intracellular sialylation in CHO-cells (Pets Rijcken W R et al (1995) Biochem J. 305, 865), most approaches focus on an increased concentration of CMP-sialic acid inside the trans-Golgi. To bypass the feedback mechanism cells can be supplemented by feeding with ManNAc, which intercept the pathway beyond the GNE. The supplementation with ManNAc leads to an increased intracellular concentration of sialic acid and to an increased sialylation of recombinant glycoproteins. Yet another strategy is the overexpression of UDP-GlcNAc 2-epimerase/ManAc kinase containing a sialuria mutation (see Bork K. et al (2007) *FEBS Letters* 581, 4195) in a higher eukaryotic production host. Yet another attempt to increase the CMP-sialic acid in the cytosol is the overexpression of the CMP-sialic acid synthetase. Also, the overexpression of the CMP-sialic acid Golgi transporter (to increase the CMP-sialic acid in the Golgi) and the enhanced expression of several sialyltransferases have been shown to slightly enhance the sialylation (Bragonzi A. et al (2000) *Biochim. Biophys. Acta* 1, 1474).

Despite all the described attempts to increase the sialylation efficiency of recombinant glycoproteins there is still a high degree of unpredictability in the sialylation efficiency and the sialylation pattern of recombinant proteins and also a large heterogeneity in recombinant glycoforms occurs. Current approaches in the pharmaceutical industry are still trial and error (e.g. combining multiple of the above described approaches) which not only adds complexity to the process but still leads to unexpected results.

Accordingly, there is still a need for novel strategies to engineer the sialylation of recombinant glycoproteins to obtain homogeneous forms of sialylated recombinant proteins in order to further increase the value of therapeutic proteins (see Solá, R. J. and Griebenow, K. (2009) *J Pharm Sci.* 98(4); Sinclair, A. M. and Elliott, S. (2005) *J Pharm Sci.* 94(8).

We previously established a new cellular glycosylation platform (cells having a GlycoDelete background) for the production of glycoproteins modified with more homogeneous glycans (see WO2010015722 and WO2015032899). Mammalian cells with a GlycoDelete background produce glycoproteins comprising N-glycans consisting of a GlcNAc residue, N-glycans consisting of a GlcNAc residue modified with a galactose residue (id est a LacNAc structure) and N-glycans consisting of a sialyl-LacNAc trisaccharide. Notwithstanding these apparently homogeneous and simple N-glycan structures, the production of terminal sialylated N-glycans in this platform is only 30% for IgG Fc linked N-glycans which are recombinantly expressed in this glycosylation platform (see Meuris et al (2014) *Nat. Biotechn.* 32, 5, 485). We investigated whether it would be possible to further increase sialylation efficiency in the GlycoDelete background.

SUMMARY OF THE INVENTION

In the present invention we surprisingly found that higher eukaryotic cells, having a GlycoDelete background, and expressing a nucleic acid sequence encoding a mutant UDP-N-acetylglucosamine-2-epimerase/N-acetylmannosamine kinase which is insensitive to CMP-Neu5Ac feedback inhibition, were capable of producing significantly higher amounts of sialyl-LacNAc N-glycans on a recombinant glycoprotein as compared to a higher eukaryotic cell having a GlycoDelete background expressing the same recombinant glycoprotein. These significantly higher amounts of N-glycans consisting of sialyl-LacNAc trisaccharides formed are at least 10%, at least 20%, at least 30%, at least 40%, at least 50% higher than the higher eukaryotic cells having only a GlycoDelete background.

The present invention offers eukaryotic cellular expression systems which produce homogeneous forms of small sialylated N-glycans on recombinant glycoproteins.

Therefore, in one aspect the invention provides a eukaryotic cell comprising:
- a first exogenous nucleic acid sequence encoding an endoglucosaminidase enzyme,
- a second nucleic acid sequence encoding a mutant UDP-N-acetylglucosamine-2-epimerase/N-acetylmannosamine kinase which is insensitive to CMP-Neu5Ac feedback inhibition;
- a third exogenous nucleic acid sequence encoding a glycoprotein, and
- optionally an exogenous nucleic acid sequence encoding a beta-(1,4)-galactosyltransferase.

In another aspect the invention provides a eukaryotic cell which is deficient in complex glycosylation comprising:
- a first exogenous nucleic acid sequence encoding an endoglucosaminidase enzyme,
- a second nucleic acid sequence encoding a mutant UDP-N-acetylglucosamine-2-epimerase/N-acetylmannosamine kinase which is insensitive to CMP-Neu5Ac feedback inhibition,
- a third exogenous nucleic acid sequence encoding a glycoprotein;
- and optionally an exogenous nucleic acid sequence encoding a beta-(1,4)-galactosyltransferase.

In a specific aspect the exogenous nucleic acids introduced in the eukaryotic cells are present on a single construct or on a single vector. The construct or vector can be integrated into the genome or can exist as a plasmid in the nucleus of the cells.

In another specific aspect the eukaryotic cell is a higher eukaryotic cell.

In another specific aspect the (higher) eukaryotic cell which is deficient in complex glycosylation lacks enzymatic activity of an enzyme needed for complex glycosylation, selected from the group consisting of ER-mannosidase I, glucosidase I, glucosidase II, N-acetylglucosaminyl transferase I, N-acetylglucosaminyl transferase II or mannosidase II.

In yet another specific aspect the higher eukaryotic cell lacks N-acetylglucosaminyl transferase 1 enzymatic activity.

In yet another aspect the invention provides a higher eukaryotic cell which is deficient in complex glycosylation comprising:
- a first exogenous nucleic acid sequence encoding an endoglucosaminidase enzyme,
- a second nucleic acid sequence encoding a mutant UDP-N-acetylglucosamine-2-epimerase/N-acetylmannosamine kinase which is insensitive to CMP-Neu5Ac feedback inhibition,
- a third exogenous nucleic acid sequence encoding a glycoprotein,
- a fourth exogenous nucleic acid sequence encoding an alfa-2,3-sialyltransferase and/or an exogenous nucleic acid sequence encoding an alfa-2,6-sialyltransferase,
- and optionally an exogenous beta-1,4-galactosyltransferase.

In yet another aspect the invention provides a higher eukaryotic cell which is deficient in complex glycosylation and said cell lacks UDP-Glc-4-epimerase activity comprising:
- a first exogenous nucleic acid sequence encoding an endoglucosaminidase enzyme,
- a second nucleic acid sequence encoding a mutant UDP-N-acetylglucosamine-2-epimerase/N-acetylmannosamine kinase which is insensitive to CMP-Neu5Ac feedback inhibition,
- a third exogenous nucleic acid sequence encoding a glycoprotein,
- a fourth exogenous nucleic acid sequence encoding an alfa-2,3-sialyltransferase and/or an alfa-2,6-sialyltransferase,
- a fifth exogenous nucleic acid sequence encoding an UDP-Glc-4-epimerase, and
- optionally an exogenous beta-1,4-galactosyltransferase.

A higher eukaryotic cell which lacks UDP-Glc-4-epimerase activity is typically a cell which has a mutation introduced in the UDP-Glc-4-epimerase so that the gene is not expressed anymore, typically such a mutation is a gene disruption the UDP-Glc-4-epimerase.

In specific aspects the endoglucosaminidase enzyme and/or the beta-1,4-galactosyltransferase and/or the alfa-2,3-sialyltransferase and/or the alfa-2,6-sialyltransferase are operably linked to an ER or Golgi localization signal.

In another specific aspect the endoglucosaminidase is operably linked to a secretion signal.

In still other specific aspects the higher eukaryotic cell of the invention further comprises an exogenous nucleic acid sequence encoding a polysialyltransferase.

In other specific aspects the cells of the invention are used to produce a sialylated or polysialylated glycoprotein.

In another aspect the invention provides a composition comprising a plurality of glycosylated forms of a recombinant Fc-fusion protein, wherein glycosylated forms comprise N-glycans consisting of GlcNAc residues, glycosylated forms comprising N-glycans consisting of LacNAc disaccharides and glycosylated forms comprising N-glycans consisting of sialyl-LacNAc trisaccharides of said Fc-fusion protein are present in said composition, and wherein the amount of glycosylated forms comprising N-glycans consisting of sialyl-LacNAc trisaccharides is at least 39% in the pool of glycosylated forms comprising N-glycans consisting of GlcNAc residues, glycosylated forms comprising N-glycans consisting of LacNAc disaccharides and glycosylated forms comprising N-glycans consisting of sialyl-LacNAc trisaccharides of said Fc-fusion protein.

In a specific aspect said plurality of glycoforms present in the composition is derived from a recombinant IgG Fc-fusion protein.

In another specific aspect said plurality of glycoforms present in the composition is derived from a recombinant IgA Fc-fusion protein.

In another aspect the invention provides a composition comprising a plurality of glycosylated forms of a recombinant monoclonal antibody, wherein glycosylated forms comprising N-glycans consisting of GlcNAc residues, glycosylated forms comprising N-glycans consisting of LacNAc disaccharides and glycosylated forms comprising N-glycans consisting of sialyl-LacNAc trisaccharides of said monoclonal antibody are present in said composition, and wherein the amount of glycosylated forms comprising N-glycans consisting of sialyl-LacNAc trisaccharides is at least 39% in the pool of glycosylated forms comprising N-glycans consisting of GlcNAc residues, glycosylated forms comprising N-glycans consisting of LacNAc disaccharides and glycosylated forms comprising N-glycans consisting of sialyl-LacNAc trisaccharides of said monoclonal antibody.

In another specific aspect the invention provides a glycoprotein present in the composition of the invention which can be a growth factor, an antibody, a single domain antibody, an antibody fragment, a vaccine, a regulatory protein, a cytokine, a membrane protein, an antigen, a receptor, a VHH or a glycoprotein comprising an artificially introduced N-glycosylation site.

In another specific aspect the invention provides a composition of the invention which can be used as a medicament.

In another specific aspect the invention provides a pharmaceutical composition comprising a composition according to the invention.

In another specific aspect the invention provides a composition comprising a conjugate comprising a glycosylated form of an Fc-containing molecule protein, said glycosylated form comprising N-glycans consisting of sialyl-LacNAc trisaccharides present in a composition as described herein before and a conjugated moiety connected to said glycan consisting of sialyl-LacNAc trisaccharide.

In another specific aspect the invention provides the use of a composition as described herein before to produce a conjugate as described herein before.

In another specific aspect the invention provides a composition as described herein before or a conjugate as described herein before for use as a medicament.

In another specific aspect the invention provides a pharmaceutical composition comprising a composition as described herein before or a conjugate as described herein before.

DETAILED DESCRIPTION OF THE APPLICATION

The present invention will be described with respect to particular embodiments and with reference to certain drawings, but the invention is not limited thereto but only by the claims. Any reference signs in the claims shall not be construed as limiting the scope. The drawings described are only schematic and are non-limiting. In the drawings, the size of some of the elements may be exaggerated and not drawn on scale for illustrative purposes. Where the term "comprising" is used in the present description and claims, it does not exclude other elements or steps. Where an indefinite or definite article is used when referring to a singular noun e.g. "a" or "an", "the", this includes a plural of that noun unless something else is specifically stated. Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The following terms or definitions are provided solely to aid in the understanding of the invention. Unless specifically defined herein, all terms used herein have the same meaning as they would to one skilled in the art of the present invention. Practitioners are particularly directed to Sambrook et al., Molecular Cloning: A Laboratory Manual, 4th ed., Cold Spring Harbor Press, Plainsview, New York (2012); and Ausubel et al., Current Protocols in Molecular Biology (Supplement 114), John Wiley & Sons, New York (2016), for definitions and terms of the art. The definitions provided herein should not be construed to have a scope less than understood by a person of ordinary skill in the art.

As used herein, the term "nucleotide sequence" refers to a polymeric form of nucleotides of any length, either deoxyribonucleotides or ribonucleotides, or analogs thereof. Nucleotide sequences may have any three-dimensional structure, and may perform any function, known or unknown. Non-limiting examples of nucleotide sequences include a gene, a gene fragment, exons, introns, messenger RNA (mRNA), transfer RNA, ribosomal RNA, ribozymes, cDNA, recombinant polynucleotides, branched polynucleotides, plasmids, vectors, isolated DNA of any sequence, control regions, isolated RNA of any sequence, nucleic acid probes, and primers. The nucleotide sequence may be linear or circular.

As used herein, the term "polypeptide" refers to a polymeric form of amino acids of any length, which can include coded and non-coded amino acids, chemically or biochemically modified or derivatized amino acids, and polypeptides having modified peptide backbones. Polypeptide sequences can be depicted with the single-letter (or one letter) amino acid code or the three-letter amino acid code as depicted here below:

| Amino acid | Three letter code | One letter code |
|---|---|---|
| alanine | ala | A |
| arginine | arg | R |
| asparagine | asn | N |
| aspartic acid | asp | D |
| asparagine or aspartic acid | asx | B |
| cysteine | cys | C |
| glutamic acid | glu | E |
| glutamine | gln | Q |
| glutamine or glutamic acid | glx | Z |
| glycine | gly | G |
| histidine | his | H |
| isoleucine | ile | I |
| leucine | leu | L |
| lysine | lys | K |
| methionine | met | M |
| phenylalanine | phe | F |
| proline | pro | P |
| serine | ser | S |
| threonine | thr | T |
| tryptophan | trp | W |
| tyrosine | tyr | Y |
| valine | val | V |

The term "Glycosylation acceptor site" refers to a position within a polypeptide which can be N- or O-glycosylated. N-linked glycans are typically attached to Asparagine (Asn), while O-linked glycans are commonly linked to the hydroxyl oxygen of serine, threonine, tyrosine, hydroxylysine, or hydroxyproline side-chains.

The term "N-glycosylation acceptor site" refers to a position within a polypeptide which can be N-glycosylated. N-linked glycans are typically attached to Asparagine (Asn) which resides in a consensus site. An "NXT", "NXS", "NXC" or "NXV" motif refers to the consensus sequences Asn-Xaa-Thr/Ser or Asn-Xaa-Cys/Val, wherein Xaa can be any amino acid except proline (Shrimal, S. and Gilmore, R., *J Cell Sci.* 126(23), 2013, Sun, S. and Zhang, H., *Anal. Chem.* 87 (24), 2015). It is well known in the art that potential N-glycosylation acceptor sites are specific to the consensus sequence Asn-Xaa-Thr/Ser or Asn-Xaa-Cys/Val. It has been shown in the art that the presence of proline between Asn and Thr/Ser leads to inefficient N-glycosylation.

The term "expression vector", as used herein, includes any vector known to the skilled person, including plasmid vectors, cosmid vectors, phage vectors, such as lambda phage, viral vectors, such as adenoviral, AAV or baculoviral vectors, or artificial chromosome vectors such as bacterial artificial chromosomes (BAC), yeast artificial chromosomes (YAC), or P1 artificial chromosomes (PAC). Expression vectors generally contain a desired coding sequence and appropriate promoter sequences necessary for the expression of the operably linked coding sequence in a particular host organism (e.g. higher eukaryotes, lower eukaryotes).

Typically, a vector comprises a nucleotide sequence in which an expressible promoter or regulatory nucleotide sequence is operatively linked to, or associated with, a nucleotide sequence or DNA region that codes for an mRNA, such that the regulatory nucleotide sequence is able to regulate transcription or expression of the associated nucleotide sequence. Typically, a regulatory nucleotide sequence or promoter of the vector is not operatively linked to the associated nucleotide sequence as found in nature, hence is heterologous to the coding sequence of the DNA region operably linked to. The term "operatively" or "operably" "linked" as used herein refers to a functional linkage between the expressible promoter sequence and the DNA region or gene of interest, such that the promoter sequence is able to initiate transcription of the gene of interest, and refers to a functional linkage between the gene of interest and the transcription terminating sequence to assure adequate termination of transcription in eukaryotic cells. In addition, this term also refers to the linkage between a targeting sequence and the open reading frame of an enzyme. An "inducible promoter" refers to a promoter that can be switched 'on' or 'off' (thereby regulating gene transcription) in response to external stimuli such as, but not limited to, temperature, pH, certain nutrients, specific cellular signals, et cetera. It is used to distinguish between a "constitutive promoter", by which a promoter is meant that is continuously switched 'on', i.e. from which gene transcription is constitutively active.

A "glycan" generally refers in the art to glycosidically linked monosaccharides, oligosaccharides and polysaccharides. Hence, carbohydrate portions of a glycoconjugate, such as a glycoprotein, glycolipid, or a proteoglycan are referred to herein as a "glycan". Glycans can be homo- or heteropolymers of monosaccharide residues, and can be linear or branched. Generally N-linked glycans may be composed of GalNAc, Galactose, neuraminic acid, N-acetylglucosamine, Fucose, Mannose, and other monosaccharides, as also exemplified further herein.

In eukaryotes, O-linked glycans are assembled one sugar at a time on a serine or threonine residue of a peptide chain in the Golgi apparatus. Unlike N-linked glycans, there are no known consensus sequences but the position of a proline residue at either −1 or +3 relative to the serine or threonine is favourable for O-linked glycosylation.

"Complex N-glycans" in the art refers to structures with typically one, two or more (e.g. up to six) outer branches, most often linked to an inner core structure Man3GlcNAc2. The term "complex N-glycans" is well known to the skilled person and defined in literature. For instance, a complex N-glycan may have at least one branch, or at least two, of alternating GlcNAc and optionally also Galactose (Gal) residues that may terminate in a variety of oligosaccharides but typically will not terminate with a Mannose residue. For the sake of clarity, a single GlcNAc, LacNAc (=GlcNAc-Gal), sialyl-LacNAc present on an N-glycosylation site of a glycoprotein (thus lacking the inner core structure Man3GlcNAc2) is not regarded as a complex N-glycan.

'Glycoproteins' as used in the application refers to proteins that, in their normal physiological context and/or their functional form, contain oligosaccharide chains (N-glycans) covalently attached to their polypeptide side-chains. In addition, a glycoprotein comprises also proteins with an artificially introduced glycosylation site, particularly an artificially introduced N-glycosylation site. Typically, a glycoprotein, typically a recombinant glycoprotein, for example a heterologous recombinant glycoprotein (which does not occur normally in the eukaryotic organism) is produced as several glycoforms when it is made in a eukaryotic organism such as a N-glycosylation-engineered eukaryotic organism. To further illustrate this, when a glycoprotein, comprising one N-glycan acceptor glycosylation site is produced, according to claim 1 of the present invention in a eukaryotic host such as a mammalian host, then the following situations can occur: i) the N-glycan acceptor site carries no N-glycan—in this case an unglycosylated glycoprotein is produced, ii) N-glycans consisting of a GlcNAc residue is formed, iii) N-glycans consisting of a LacNAc disaccharide is formed, iv) N-glycans consisting of a sialyl-LacNAc trisaccharide is formed and v) a fraction of aberrant N-glycans are present of which structure is unpredictable and depends on the host and on the nature of the glycoprotein. Such aberrant N-glycans can comprise for example N-glycosylation structures which are not completely processed by the exogenous endoglucosaminidase and for example fucose-linked GlcNAc structures as described in Felix J. et al (2015) Structure 23, 1621-1631. Thus, a glycoform is an N-glycosylated form a glycoprotein meaning that an unglycosylated glycoprotein is not a glycoform. Thus, a glycoprotein comprising one N-glycan glycosylation site produced according to claim 1, predominantly consists of more than 80%, 90%, or even more than 95% of 3 different glycoforms (id est a N-glycosylated protein comprising N-glycans consisting of GlcNAc residues, N-glycans consisting of LacNAc disaccharide and N-glycans consisting of sialyl-LacNAc trisaccharide). Thus, different glycoforms (even originating from one specific functional N-glycosylation site on a (recombinant) glycoprotein) occur because of the very nature of the process of N-glycosylation of which each step is not 100% efficient. A non-limiting list of glycoproteins is provided in the specification. The term 'glycoproteins' is not intended to refer to the length of the amino acid chain, 'glycopeptides' are included within the definition of 'glycoproteins'.

The terms '(glyco)protein' and 'enzyme' (e.g. endoglucosaminidase, glycosyltransferase, mannosidase, mannosyltransferase) as used in the application are also intended to cover functionally active fragments and variants of the naturally occurring proteins. Indeed, for many (e.g. therapeutic) proteins, part of the protein may be sufficient to achieve an (e.g. therapeutic, enzymatic) effect. The same applies for variants (i.e. proteins in which one or more amino acids have been substituted with other amino acids, but which retain functionality or even show improved functionality), in particular for variants of the enzymes optimized for enzymatic activity. In the context of the application, a glycoprotein refers to the protein itself; a glycoprotein may be either in its glycosylated or non-glycosylated form. A 'glycosylated' protein is a (glyco)protein that carries at least one oligosaccharide chain. An N-glycosylated protein, particularly an N-glycosylated recombinant glycoprotein, is a glycoprotein which carries at least one oligosaccharide chain on an N-glycan.

The nature of the glycoprotein is not critical to the invention, but glycoproteins will typically be proteins relevant for medicine and/or industry for which homogeneous N-glycosylation is important. Non-limiting examples include many hormones, growth factors, cytokines and their corresponding receptors, such as follicle-stimulating hormone (FSH), luteinizing hormone (LH), thyroid-stimulating hormone (TSH), epidermal growth factor (EGF), human epidermal growth factor receptor-2 (HER-2), fibroblast growth factor-alpha (FGF-α), fibroblast growth factor-beta (FGF-β), transforming growth factor-alpha (TGF-α), transforming growth factor-beta (TGF-β), platelet-derived growth factor (PDGF), insulin-like growth factor-1 (IGF-1), insulin-like growth factor-2 (IGF-2), nerve growth factor (NGF), nerve growth factor-beta (NGF-β); receptors of the aforementioned, growth hormones (e.g., human growth hormone, bovine growth hormone); insulin (e.g., insulin A chain and insulin B chain), proinsulin; erythropoietin (EPO); colony stimulating factors (e.g., granulocyte colony-stimulating factor (G-CSF), granulocyte macrophage colony-stimulating factor (GM-CSF), macrophage colony-stimulating factor (M-CSF)); interleukins (e.g., IL-1 through IL-33); vascular endothelial growth factor (VEGF) and its receptor (VEGF-R); interferons (e.g., IFN-α, β, or γ); tumor necrosis factor (e.g., TNF-α and TNF-β) and their receptors, TNFR-1 and TNFR-2; thrombopoietin (TPO); thrombin; brain natriuretic peptide (BNP); clotting factors (e.g., Factor VIII, Factor IX, von Willebrands factor, and the like); anti-clotting factors; tissue plasminogen activator (TPA), e.g., urokinase or human urine or tissue type TPA; calcitonin; CD proteins (e.g., CD3, CD4, CD8, CD28, CD19, etc.); CTLA proteins (e.g., CTLA4); T-cell and B-cell receptor proteins; antibodies, bone morphogenic proteins (BMPs, e.g., BMP-1, BMP-2, BMP-3, etc.); neurotrophic factors, e.g., bone derived neurotrophic factor (BDNF); neurotrophins, e.g., NT3-6; renin; rheumatoid factor; RANTES; albumin; relaxin; macrophage inhibitory protein (e.g., MIP-1, MIP-2); viral proteins or antigens; surface membrane proteins; ion channel proteins; enzymes; alkaline phosphatase; lectins; regulatory proteins; antibodies; immunomodulatory proteins, (e.g., HLA, MHC, the B7 family); homing receptors; transport proteins; superoxide dismutase (SOD); G-protein coupled receptor proteins (GPCRs); neuromodulatory proteins; Alzheimer's Disease associated proteins and peptides, (e.g., A-beta), and others as known in the art, including fusion or chimeric proteins of the above.

A 'glycoform' as used in the present invention is a variant of a glycosylated glycoprotein wherein the variation is in the N-glycan composition present on said glycoprotein. Typically, glycoforms in the present invention comprise glycan structures consisting of only a GlcNAc residue, only a LacNAc (which is GlcNAc-Gal) disaccharide and only a sialyl-LacNAc trisaccharide.

An 'endoglucosaminidase' as used herein refers to enzymes that hydrolyse the bond between the anomeric carbon of a non-terminal beta-linked N-acetylglucosamine residue in an oligosaccharide of a glycoprotein or a glycolipid, and its aglycon, thereby releasing mono- or oligosaccharides from glycoproteins or glycolipids or sugar polymers. Endoglucosaminidases are a subset of the glycosidases, and may or may not have other enzymatic activities (such as e.g. glycosyltransferase activity). A particular class of endoglucosaminidases is formed by the endo-β-N-acetylglucosaminidases or mannosyl-glycoprotein endo-β-N-acetylglucosaminidases, indicated as EC 3.2.1.96 in the International Union of Biochemistry and Molecular Biology (IUBMB) nomenclature. This particular class of enzymes are capable of catalyzing the endohydrolysis of the N,N'-diacetylchitobiosyl unit in high-mannose glycopeptides and glycoproteins containing the -[Man (GlcNAc)$_2$]Asn-structure. One N-acetyl-D-glucosamine (GlcNAc) residue remains attached to the protein; the rest of the oligosaccharide is released intact. The result thus is a single GlcNAc-modified N-glycosylation site present on a glycoprotein. A particular preferred class of endoglucosaminidases is formed by the mannosyl-glycoprotein endo-β-N-acetylglucosaminidases, indicated as EC 3.2.1.96 in the IUBMB nomenclature. These enzymes can remove sugar chains (hybrid N-glycans, high mannose N-glycans and neoglycoforms of N-glycans as shown herein) while leaving one GlcNAc residue on the protein. Examples of these include, but are not limited to Endo A, Endo BH, Endo CE, Endo D, Endo F1, Endo H, Endo M, Endo T (see also WO2006/050584), and ENGase. Other examples are known to the skilled person and can for instance be found on www.cazy.org, in particular under the Glycoside Hydrolase Family 85 and 18. Particularly envisaged is the use of the Endo T enzyme from *Hypocrea jecorina* (formerly known as *Trichoderma reesei*) that is described in WO2006/050584 (see e.g. SEQ IDs 9-12 therein).

A 'glycosyltransferase' as used in the application is any of a group of enzymes that catalyze the transfer of glycosyl groups in biochemical reactions, in particular glycosyl transfer to asparagine-linked sugar residues to give N-linked glycoproteins. Glycosyltransferases fall under EC 2.4 in the IUBMB nomenclature, a particular class of glycosyltransferases are hexosyltransferases (EC 2.4.1). Among the wide variety of these post-translational enzymes that process peptides into glycoproteins are enzymes such as, but not limited to, N-acetylglucosaminyl transferases, N-acetylgalactosaminyltransferases, sialyltransferases, fucosyltransferases, galactosyltransferases, and mannosyltransferases.

Note that exogenous mannosyltransferases are excluded for specific embodiments of N-glycosylation-engineered yeast cells described in the application. 'Mannosyltransferases' as used in the application refers to enzymes that catalyze the transfer of a mannosyl group to an acceptor molecule, typically another carbohydrate, in the Golgi apparatus. Mannosyltransferases are typically endogenous enzymes in fungi and yeast and involved in the synthesis of high-mannose type glycans.

A "higher eukaryotic cell" as used herein refers to eukaryotic cells that are not cells from unicellular organisms. In other words, a higher eukaryotic cell is a cell from (or derived from, in case of cell cultures) a multicellular eukaryote such as a human cell line or another mammalian cell line (e.g. a CHO cell line). Particularly, the term generally refers to mammalian cells, human cell lines and insect cell lines. More particularly, the term refers to vertebrate cells, even more particularly to mammalian cells or human cells. The higher eukaryotic cells as described herein will typically be part of a cell culture (e.g. a cell line, such as a HEK or CHO cell line).

By "lower eukaryotic cell" a filamentous fungus cell or a yeast cell is meant. Yeast cells can be from the species *Saccharomyces* (e.g. *Saccharomyces cerevisiae*), *Hansenula* (e.g. *Hansenula polymorpha*), *Arxula* (e.g. *Arxula adeninivorans*), *Yarrowia* (e.g. *Yarrowia lipolytica*), *Kluyveromyces* (e.g. *Kluyveromyces lactis*), or *Komagataella phaffii* (Kurtzman, C. P. (2009) *J Ind Microbiol Biotechnol*. 36(11) which was previously named and better known under the old nomenclature as *Pichia pastoris* and also further used herein. According to a specific embodiment, the lower eukaryotic cells are *Pichia* cells, and in a most particular embodiment *Pichia pastoris* cells. In specific embodiments the filamentous fungus cell is *Myceliopthora thermophila* (also known as C1 by the company Dyadic), *Aspergillus* species (e.g. *Aspergillus nidulans, Aspergillus niger, Aspergillus oryzae, Aspergillus japonicus*), *Fusarium* species (e.g. *Fusarium venenatum*), *Hypocrea* and *Trichoderma* species (e.g. *Trichoderma reesei*).

Essential to the present invention, the "lower or higher eukaryotic cell" of the present invention is a glyco-engineered cell. A "glyco-engineered cell" refers to a cell that has been genetically modified so that it expresses proteins with an altered N-glycan structure and/or O-glycan structure as compared to in a wild type background. Typically, the naturally occurring modifications on glycoproteins have been altered by genetic engineering of enzymes involved in the glycosylation pathway. In general, sugar chains in N-linked glycosylation may be divided in three types: high-mannose (typically yeast), complex (typically mammalian) and hybrid type glycosylation. Besides that, a variety of O-glycan patterns exist, for example with yeast oligomannosylglycans differing from mucin-type O-glycosylation in mammalian cells. The different types of N- and O-glycosylation are all well known to the skilled person and defined in the literature. Considerable effort has been directed towards the identification and optimization of strategies for the engineering of eukaryotic cells that produce glycoproteins having a desired N- and/or O-glycosylation pattern and are known in the art (e.g. De Pourcq, K. et al., Appl Microbiol Biotechnol. 87(5), 2010).

In the present invention the glyco-engineered cells (or the glyco-engineered expression system) which are used are described in patent applications WO2010015722 and WO2015032899 (further designated herein as GlycoDelete cells, or cells having a GlycoDelete background) and in Meuris L, et al (2014) *Nat. Biotechn*, 32(5) 485) and relates to a eukaryotic cell expressing both at least an endoglucosaminidase enzyme and a target protein, and wherein the recombinant secreted target proteins are characterized by a uniform N-glycosylation pattern (in particular one single GlcNAc residue (in lower eukaryotes) or a modification thereof such as GlcNAc modified with Galactose (LacNAc) or sialyl-LacNAc (in mammalian cells). Particularly preferred in the present invention are higher eukaryotic cells which have a GlycoDelete background. Lower eukaryotic cells having a GlycoDelete background produce N-glycans having one single GlcNAc residue. Lower eukaryotic cells can be used in the context of the present invention but then the sialic acid synthetic pathway needs to be introduced. Such engineering of the monophosphate-sialic acid synthetic pathway in lower eukaryotic cells is described in WO2005090552 and Hamilton S R et al (2006) *Science* Vol. 313, 1441). As heterogeneity in glycosylation does not only originate from N-linked sugars, but also from 0-glycans attached to the glycoprotein, it can be desirable to remove these diverse carbohydrate chains from the polypeptides of the invention. This can be achieved by expressing an endoglucosaminidase enzyme in a cell that is deficient in expression and/or activity of an endogenous UDP-Galactose 4-epimerase (GalE) as described in WO2017005925. Cells described in the latter application are also particularly envisaged as glyco-engineered cells according to the present invention and herein further described as GlycoDoubleDelete cells or cells having a GlycoDoubleDelete background.

An 'ER localization signal' or a 'Golgi localization signal' is a molecule, typically a peptide that directs localization of the polypeptide or protein to which it is conjugated to the ER or Golgi apparatus, respectively. Localization thus also implies retention in the ER or Golgi apparatus, respectively. Typically, these localization (or retention) sequences are peptide sequences derived from (pre)proteins that are situated in the ER or Golgi when functionally active as a mature protein.

The term 'beta-1,4-galactosyltransferase' in the present invention refers to an enzyme that has exclusive specificity for the donor substrate UDP-galactose; all transfer galactose in a beta1,4 linkage to similar acceptor sugars: GlcNAc, Glc, and Xyl. In the present invention the beta-1,4-galactosyltransferase adds galactose to N-acetylglucosamine residues that are either monosaccharides or the nonreducing ends of glycoprotein carbohydrate chains.

The term 'UDP-N-acetylglucosamine-2-epimerase/N-acetylmannosamine kinase' in the present invention refers to a bifunctional enzyme that initiates and regulates the biosynthesis of N-acetylneuraminic acid (NeuAc), a precursor of sialic acids. It is a rate-limiting enzyme in the sialic acid biosynthetic pathway. The enzyme is allosterically regulated and hence is subject to feedback inhibition by cytidine monophosphate-N-acetylneuraminic acid (CMP-Neu5Ac), the end product of neuraminic acid biosynthesis.

The term 'UDP-Glc-4-epimerase' refers to the enzyme UDP-glucose 4-epimerase also known as UDP-galactose 4-epimerase or GALE, which is a homodimeric epimerase found in bacterial, fungal, plant, and mammalian cells. This enzyme performs the final step in the Leloir pathway of galactose metabolism, catalyzing the reversible conversion of UDP-galactose to UDP-glucose.

The term 'polysialyltransferase' refers to the following. Polysialic acid (PSA) is a natural homopolymer of sialic acids in a α-2,8 linkage. PSA also exists as part of the cell wall of certain bacteria (in alpha-2,8 linkage, in alpha-2,9 linkage and mixed versions thereof). Over the last decades, the human and several bacterial polysialyltransferase enzymes have been identified and studied. ST8Sia II (STX) and ST8Sia IV (PST) are the key enzymes which control the expression of polysialic acid, these enzymes belong to a family of six genes encoding alpha 2,8-sialyltransferases. Both ST8Sia II and IV can transfer multiple alpha 2,8-linked sialic acid residues to an acceptor N-glycan containing a NeuNAc alpha 2→3 (or 6) Gal beta 1→4GlcNAc beta 1→R structure without participation of other enzymes. Polysialyltransferases are also known in the art derived from the bacteria *Neisseria meningitidis*, *Escherichia coli* K1, *Escherichia coli* K92 (H52N mutant), and *Mannheimia haemolytica* A2. In addition, a bifunctional α2,3/α2,8-sialyltransferase (CstII) from *Campylobacter jejuni* has been descried in the art.

The invention provides in a first embodiment a eukaryotic cell comprising:
 a first exogenous nucleic acid sequence encoding an endoglucosaminidase enzyme,
 a second nucleic acid sequence encoding a mutant UDP-N-acetylglucosamine-2-epimerase/N-acetylmannosamine kinase which is insensitive to CMP-NeuNAc feedback inhibition; and
 a third exogenous nucleic acid sequence encoding a glycoprotein, and
 optionally an exogenous nucleic acid sequence encoding a beta-(1,4)-galactosyltransferase.

In yet another embodiment the invention provides a eukaryotic cell which is deficient in complex glycosylation comprising:
 a first exogenous nucleic acid sequence encoding an endoglucosaminidase enzyme,
 a second nucleic acid sequence encoding a mutant UDP-N-acetylglucosamine-2-epimerase/N-acetylmannosamine kinase which is insensitive to CMP-Neu5Ac feedback inhibition; and
 a third exogenous nucleic acid sequence encoding a glycoprotein, and
 optionally an exogenous nucleic acid sequence encoding a beta-(1,4)-galactosyltransferase.

In yet another embodiment the invention provides a higher eukaryotic cell which is deficient in complex glycosylation comprising:

a first exogenous nucleic acid sequence encoding an endoglucosaminidase enzyme,
 a second nucleic acid sequence encoding a mutant UDP-N-acetylglucosamine-2-epimerase/N-acetylmannosamine kinase which is insensitive to CMP-Neu5Ac feedback inhibition; and
 a third exogenous nucleic acid sequence encoding a glycoprotein, and
 optionally an exogenous nucleic acid sequence encoding a beta-(1,4)-galactosyltransferase.

In yet another embodiment the invention provides a higher eukaryotic cell which is deficient in complex glycosylation and which is deficient in UDP-Glc-4-epimerase activity comprising:
 a first exogenous nucleic acid sequence encoding an endoglucosaminidase enzyme,
 a second nucleic acid sequence encoding a mutant UDP-N-acetylglucosamine-2-epimerase/N-acetylmannosamine kinase which is insensitive to CMP-Neu5Ac feedback inhibition; and
 a third exogenous nucleic acid sequence encoding a glycoprotein, and
 optionally an exogenous nucleic acid sequence encoding a beta-(1,4)-galactosyltransferase.

In a specific embodiment the higher eukaryotic cell which is deficient in complex glycosylation lacks enzymatic activity of an enzyme needed for complex glycosylation, selected from the group consisting of ER-mannosidase I, glucosidase I, glucosidase II, N-acetylglucosaminyl transferase I, N-acetylglucosaminyl transferase II or mannosidase II.

In a particular embodiment the higher eukaryotic cell which is deficient in complex glycosylation lacks enzymatic activity of N-acetylglucosaminyltransferase I.

The wording "a mutant UDP-N-acetylglucosamine-2-epimerase/N-acetylmannosamine kinase which is insensitive to CMP-Neu5Ac feedback inhibition" refers to an enzyme (abbreviated as GNE/MNK) which has been modified to reduce binding to CMP-sialic acid. In particular the GNE/MNK is modified in the region of amino acids 260-270 to replace one or more arginine residues with any amino acid but arginine. Even more particularly the GNE/MNK is modified to substitute ore or more of Arg263 and Arg266 with any amino acid but arginine. Even more particularly the GNE/MNK is modified on position 263 from Arginine to Leucine and at position 266 from Arginine to glutamine. The mutant enzyme has been described to enhance the steady state concentration of CMP-sialic acid in a higher eukaryotic cell (see WO01/59075, EP2534249B1 and Bork K. et al (2007) *FEBS Letters* 571, 4195). EP2534279B1 teaches the GNE/MNK sequence in SEQ ID NO: 1.

Higher eukaryotic cells can comprise the mutant GNE/MNK as an exogenous nucleic acid (e.g. comprised in a vector) but the mutant GNE/MNK may also be engineered by a variety of gene editing approaches. For example, zinc finger nucleases (ZFN) are artificial restriction enzymes generated by fusing a zinc finger DNA-binding domain to a DNA-cleavage domain. Zinc finger domains can be engineered to target desired DNA sequences, which enables zinc-finger nucleases to target a unique sequence within a complex genome. By taking advantage of endogenous DNA repair machinery, these reagents can be used to precisely alter the genomes of simple and higher organisms. Other technologies for genome engineering that can be used to modify genes are meganucleases and TAL effector nucleases (TALENs, Cellectis bioresearch). A TALEN® is composed of a TALE DNA binding domain for sequence-specific recognition fused to the catalytic domain of an endonuclease that introduces double strand breaks (DSB). The DNA binding domain of a TALEN® is capable of targeting with high precision a large recognition site (for instance 17 bp). Meganucleases are sequence-specific endonucleases, naturally occurring "DNA scissors", originating from a variety of single-celled organisms such as bacteria, yeast, algae and some plant organelles. Meganucleases have long recognition sites of between 12 and 30 base pairs. The recognition site of natural meganucleases can be modified in order to target native genomic DNA sequences (such as endogenous genes). Another recent and very popular genome editing technology is the CRISPR-Cas system, which can be used to achieve RNA-guided genome engineering. CRISPR interference is a genetic technique which allows for sequence-specific control of gene expression in prokaryotic and eukaryotic cells. It is based on the bacterial immune system-derived CRISPR (clustered regularly interspaced palindromic repeats) pathway and has been modified to edit basically any genome. By delivering the Cas nuclease (in many cases Cas9) complexed with a synthetic guide RNA (gRNA) in a cell, the cell's genome can be cut at a desired location depending on the sequence of the gRNA, allowing existing genes to be removed and/or new one added and/or more subtly removing, replacing or inserting single nucleotides (e.g. DiCarlo et al 2013 Nucl Acids Res doi:10.1093/nar/ gkt135; Sander & Joung 2014 Nat Biotech 32:347-355).

In a particular aspect, the exogenously introduced genes can be present on one single construct (e.g. a vector) or can be introduced as separate constructs.

In yet another particular aspect the eukaryotic cells of the invention can further comprise other exogenous nucleic acid sequences such as an alfa-2,3-sialyltransferase, an UDP-Glc-4-epimerase, a CMP-sialic acid transporter or overexpression of the CMP-sialic acid synthetase (Wong S C N et al (2006) *Biotechnol. and Bioeng.* 1005).

In preferred aspects, the eukaryotic cells of the invention, have the endoglucosaminidase enzyme and/or the beta-1,4-galactosyltransferase enzymes and/or the alfa-2,3-sialyltransferases and/or the alfa-2,6-sialyltransferases are operably linked to an ER or Golgi localization signal.

We previously showed (Meuris et al (2014) *Nat. Biotechn.* 32, 5, 485) that glycans produced in a higher eukaryotic cell with a GlycoDelete background consist of sialylated linear trisaccharide N-glycans in which the sialic acid linkage is an alfa-2-3-sialic acid (id est the NeuNAc-Gal-GlcNAc structure). These linear chains contain only 1 NeuNAc as compared to the multi-branched structures common in wild type mammalian cells. This enables 1:1 coupling per glycan site, making the glycoconjugate easier to characterize. The linear tri-saccharides are therefore ideally suited for the generation of poly-sialic acid structures on recombinant glycoproteins. To reduce renal filtration and enhance the circulatory half-life of smaller protein drugs, proteins are often PEGylated. Although this is a well-validated technology, chronic use can trigger an anti-PEG immune response, leading to accelerated blood clearance. PEG is also difficult to degrade in the body and can cause cytotoxicity. Poly-sialic acid (PSA) is a natural homopolymer of sialic acids α-2,8 linkage. Over the last decades, the human and several bacterial polysialyltransferase enzymes have been identified and studied. When used for therapeutic protein and peptide drug delivery, PSA provides a protective microenvironment following conjugation to the active drug. This increases the active half-life of the therapeutic drug in the body and allows it to exist largely undetected by the immune system. PSA is also biodegradable. Like PEG, PSA molecules are conjugated to specific sites of the therapeutic molecules. As with PEGylation, the current PSA conjugation process is technically complex and expensive. The multi-step, in vitro process of PSA conjugation is further complicated by the fact that standard chemical conjugation of PSA results in products with random attachment patterns and undesirable heterogeneity. Since several eukaryotic and bacterial enzymes which produce PSA have been identified it is possible to transfer such enzymes in an exogenous construct to the higher eukaryotic cells of the invention to produce PSA-conjugated proteins in a single fermentation.

Thus in yet another embodiment the higher eukaryotic cells of the invention further comprise an exogenous nucleic acid sequence encoding a polysialyltransferase.

In a particular aspect the polysialyltransferase is operably linked to an ER or Golgi localization signal.

In yet another embodiment a eukaryotic cell of the invention is used for the production of a sialylated or poly-sialylated glycoprotein.

In another specific embodiment the invention provides a composition comprising a plurality of glycoforms of a recombinant glycoprotein, wherein the N-glycans present on said glycoforms consist of a mixture of GlcNAc, LacNAc disaccharide and sialyl-LacNAc trisaccharide and wherein the N-glycans consisting of sialyl-LacNAc are present at a level of higher than 39% of the N-glycans consisting of GlcNAc, LacNAc and sialyl-LacNAc in said composition.

In another specific embodiment the invention provides a composition comprising a plurality of glycoforms of a monoclonal antibody, wherein the N-glycans present on said glycoforms consist of a mixture of GlcNAc, LacNAc and sialyl-LacNAc residues and wherein the N-glycans consisting of sialyl-LacNAc trisaccharide are present at a level of higher than 39% of the N-glycans consisting of GlcNAc, LacNAc and sialyl-LacNAc in said composition.

In another specific embodiment the invention provides a composition comprising a plurality of glycoforms of a monoclonal antibody, wherein the N-glycans present on the Fc region of said glycoforms consist of a mixture of GlcNAc, LacNAc and sialyl-LacNAc residues and wherein the N-glycans consisting of sialyl-LacNAc are present at a level of higher than 39% of the N-glycans consisting of GlcNAc, LacNAc and sialyl-LacNAc in said composition.

In another specific embodiment the invention provides a composition comprising a plurality of glycoforms of a monoclonal antibody, wherein the N-glycans present on said glycoforms consist of a mixture of GlcNAc, LacNAc and sialyl-LacNAc residues and wherein the N-glycans consisting of sialyl-LacNAc are present at a level of higher than 50% of the N-glycans consisting of GlcNAc, LacNAc and sialyl-LacNAc in said composition.

The term 'Fc-containing molecule' refers to natural proteins such as antibodies and non-natural proteins which are composed of an immunoglobin Fc domain that is directly linked to another peptide (see Czajkowsky D M et al (2012) *EMBO Mol. Med.* 4, 1015-1028). It is understood that the fused partner can be any other proteinaceous molecule of interest, such as a ligand that activates upon interaction with a cell-surface receptor, a peptidic antigen against a challenging pathogen or a 'bait' protein to identify binding partners assembled in a protein microarray. Often these fused partners have significant therapeutic potential, and they are attached to an Fc-domain to endow the hybrids with several additional beneficial biological and pharmacological properties. Perhaps most important, the presence of the Fc domain markedly increases their plasma half-life, which prolongs therapeutic activity, owing to its interaction with the salvage as well as to the slower renal clearance for larger sized molecules. The attached Fc domain also enables these molecules to interact with Fc-receptors (FcRs) found on immune cells, a feature that is particularly important for their use in oncological therapies and vaccines. From a biophysical perspective, the Fc domain folds independently and can improve the solubility and stability of the partner molecule both in vitro and in vivo, while from a technological viewpoint, the Fc region allows for easy cost-effective purification by protein-G/A affinity chromatography during manufacture. A preferred Fc region is an IgG Fc region. Another example of an Fc region is an IgA Fc region. An example of a natural occurring Fc-containing molecule is a monoclonal antibody.

In yet another embodiment the invention provides a composition comprising a plurality of glycoforms of a glycoprotein, wherein the N-glycans present on the glycoprotein of said glycoforms consist of a mixture of GlcNAc, LacNAc and sialyl-LacNAc residues and wherein the N-glycans consisting of sialyl-LacNAc trisaccharide are present at a level of higher than 39% of the N-glycans consisting of GlcNAc, LacNAc and sialyl-LacNAc in said composition and wherein the glycoprotein present in said composition is selected from the list comprising a growth factor, an antibody, a single domain antibody, an antibody fragment, a vaccine, a regulatory protein, a cytokine, a membrane protein, an antigen, a receptor, a VHH or a glycoprotein with an artificially introduced N-glycosylation site.

In yet another embodiment the invention provides the compositions of the invention for use as a medicament.

In yet another embodiment the invention provides a pharmaceutical composition comprising a composition of the invention.

In yet another embodiment the invention provides a method to produce a composition of the invention said method comprising introducing an expression vector comprising a nucleotide sequence encoding a glycoprotein in a GlycoDelete-engineered eukaryotic cell, which eukaryotic cell comprises a first exogenous nucleic acid sequence encoding an endoglucosaminidase enzyme, optionally an exogenous nucleic acid sequence encoding a beta-(1,4)-galactosyltransferase, a second nucleic acid sequence encoding a mutant UDP-N-acetylglucosamine-2-epimerase/N-acetylmannosamine kinase which is insensitive to CMP-Neu5Ac feedback inhibition; expressing said glycoprotein and isolating the resulting glycoprotein form the cells of from the growth medium.

In yet another embodiment the invention provides a method to produce a composition of the invention said method comprising introducing an expression vector comprising a nucleotide sequence encoding a glycoprotein in a GlycoDelete-engineered eukaryotic cell which is deficient in complex glycosylation and lacks ER-mannosidase I, glucosidase I, glucosidase II, N-acetylglucosaminyl transferase I, N-acetylglucosaminyl transferase II or mannosidase II enzymatic activity, which eukaryotic cell comprises a first exogenous nucleic acid sequence encoding an endoglucosaminidase enzyme, optionally an exogenous nucleic acid sequence encoding a beta-(1,4)-galactosyltransferase, a second nucleic acid sequence encoding a mutant UDP-N-acetylglucosamine-2-epimerase/N-acetylmannosamine kinase which is insensitive to CMP-Neu5Ac feedback inhibition; expressing said glycoprotein and isolating the resulting glycoprotein form the cells of from the growth medium.

In particular, higher eukaryotic cells which can be engineered towards a GlycoDelete background can be of any higher eukaryotic organism, but in particular embodiments mammalian cells are envisaged. The nature of the cells used will typically depend on the desired glycosylation properties and/or the ease and cost of producing the polypeptide described herein. Mammalian cells may for instance be used to avoid problems with immunogenicity. Higher eukaryotic cell lines for protein production are well known in the art, including cell lines with modified glycosylation pathways. Non-limiting examples of animal or mammalian host cells suitable for harboring, expressing, and producing proteins for subsequent isolation and/or purification include Chinese hamster ovary cells (CHO), such as CHO-K1 (ATCC CCL-61), DG44 (Chasin et al., 1986, Som. Cell Molec. Genet., 12:555-556; and Kolkekar et al., 1997, Biochemistry, 36:10901-10909), CHO-K1 Tet-On cell line (Clontech), CHO designated ECACC 85050302 (CAMR, Salisbury, Wiltshire, UK), CHO clone 13 (GEIMG, Genova, IT), CHO clone B (GEIMG, Genova, IT), CHO-K1/SF designated ECACC 93061607 (CAMR, Salisbury, Wiltshire, UK), RR-CHOK1 designated ECACC 92052129 (CAMR, Salisbury, Wiltshire, UK), dihydrofolate reductase negative CHO cells (CHO/−DHFR, Urlaub and Chasin, 1980, Proc. Natl. Acad. Sci. USA, 77:4216), and dp12.CHO cells (U.S. Pat. No. 5,721,121); monkey kidney CV1 cells transformed by SV40 (COS cells, COS-7, ATCC CRL-1651); human embryonic kidney cells (e.g., 293 cells, or 293T cells, or 293 cells subcloned for growth in suspension culture, Graham et al., 1977, J. Gen. Virol., 36:59); baby hamster kidney cells (BHK, ATCC CCL-10); monkey kidney cells (CV1, ATCC CCL-70); African green monkey kidney cells (VERO-76, ATCC CRL-1587; VERO, ATCC CCL-81); mouse sertoli cells (TM4, Mather, 1980, Biol. Reprod., 23:243-251); human cervical carcinoma cells (HELA, ATCC CCL-2); canine kidney cells (MDCK, ATCC CCL-34); human lung cells (W138, ATCC CCL-75); human hepatoma cells (HEP-G2, HB 8065); mouse mammary tumor cells (MMT 060562, ATCC CCL-51); buffalo rat liver cells (BRL 3A, ATCC CRL-1442); TRI cells (Mather, 1982, Annals NY Acad. Sci., 383:44-68); MCR 5 cells; FS4 cells. According to particular embodiments, the cells are mammalian cells selected from CHO cells, Hek293 cells or COS cells. According to further particular embodiments, the mammalian cells are selected from CHO cells and Hek293 cells.

While the variety of host cells which can be engineered towards a GlycoDelete background described herein before can be particularly useful to produce the specific glycans present on the polypeptide of the invention, it should be kept in mind that also combined in vivo and in vitro approaches are possible to obtain the desired glycan structures. Indeed, polypeptides of the invention which have been produced in wild type eukaryotic hosts can be purified, the glycan structures can be trimmed by suitable endoglucosaminidases or exoglycosidases and thereafter can be re-built by the in vitro use of specific glycosyltransferases (e.g. galactosyltransferases or sialyltransferases and the like). Also, GlycoDelete-engineered yeast cells which produce polypeptides having only GlcNAc residue on the artificially introduced N-glycosylation sites can be further modified to contain a galactosyltransferase or even a galactosyltransferase and a sialyltransferase so that such further glyco-engineered GlycoDelete-engineered yeast cells respectively comprise N-glycan structures consisting of LacNAc or sialyl-LacNAc as N-glycan structures.

The recombinant glycoproteins produced by the cells described herein typically should be easily recovered. This will particularly be achieved by secretion of the glycoprotein. The nature of the secretion signal typically depends on the type of eukaryotic cells used. As long as the secretion signal is functional in the cell type in which it is used (i.e.

it results in secretion to the extracellular environment of the protein or peptide to which it is fused), this feature is not critical to the invention. Thus, secretion signals from other organisms may be used, as long as these signals lead to secretion in the eukaryotic cells used. Secretion signals are well known in the art and may be derived from—typically the N-terminus of—proteins that are secreted, or may be made synthetically (e.g. Tan et al., Protein engineering 2002, vol. 15, no 4, pp. 337-345). Alternatively, they can be derived from genomic sequences using computational methods (Klee et al., BMC Bioinformatics 2005, 6:256). Also, bacterial secretion signals can be used. Further examples of signal peptides that can be used are described in WO2002/048187 (eukaryotic cells), Schaaf et al. (BMC Biotechnol. 2005; 5: 30) (moss cells), EP549062. Specific secretion signals used in yeast include e.g. α-factor secretory peptide, the PH05 secretory peptide, and the BAR1 secretion signal.

The enzymes which are expressed in the (higher) eukaryotic cells of the invention may be operably linked to an ER or Golgi localization signal. Such signal directs the enzymes to the ER or Golgi, respectively, where it is retained. As the ER and Golgi apparatus are the intracellular locations where glycosylation of proteins takes place, targeting to these organelles ensures that the enzymes are directed to the correct intracellular position to modify the glycosylation of the glycoprotein. Several ER- and Golgi-residing enzymes are type II membrane proteins. These proteins have a common domain structure comprising a short cytoplasmic tail at the amino terminus, a hydrophobic transmembrane domain, a luminal stem and a C-terminal catalytic domain. Deletion studies as well as fusions to non-Golgi-residing proteins have identified the N-terminus, and in particular the transmembrane region, as containing the targeting information of many type II membrane proteins. Localization signals are well known in the art and may be derived from proteins that are normally localized in the ER or Golgi for their function. Moreover, localization sequences from one organism may function in other organisms. According to particular embodiments, the ER or Golgi localization signal is from a protein that is itself localized in the ER or Golgi when functionally active. Examples of such proteins include, but are not limited to human β-galactoside-α-2,6-sialyltransferase (ST6GalI) and the human ganglioside-$GM_2$-synthase. According to further embodiments, the localization sequence is derived from one of the following proteins: GL2-synthase, ganglioside-$GM_2$-synthase, and α-2,6-glycosyltransferase, in particular α-2,6-sialyltransferase, most particularly β-galactoside-α-2,6-sialyltransferase.

Although secretion is particularly envisaged for easy recovery of glycoproteins, alternative options exist. The produced glycoproteins may for instance be deposited in inclusion bodies in the cell, or in membrane-bound organelles or in structures with similar functions. It should be noted that, particularly in cases where the protein is not secreted, it is possible that the protein is deposited in an inactive form. Thus, additional refolding or re-activating steps may be needed in order to obtain a physiologically relevant form of the glycoprotein.

Although, in addition to the glycoprotein, the endoglucosaminidase may also be secreted by the cell (using identical or similar secretion signals—i.e., the remarks on secretion signals for glycoproteins also apply for endoglucosaminidases), it can be a particular advantage that the endoglucosaminidase remains in the cell. This takes away the need for separation of the endoglucosaminidase and the glycoprotein which arises when both proteins are secreted. Most particularly, the endoglucosaminidase not only remains in the cell, but is also fully active. Its activity should be regulated spatiotemporally, in order to ensure that the desired hydrolysis takes place. To this end, the endoglucosaminidase may be operably linked to an ER or Golgi localization signal. Such signal directs the endoglucosaminidase to the ER or Golgi, respectively, where it is retained. As the ER and Golgi apparatus are the intracellular locations where glycosylation of proteins takes place, targeting to these organelles ensures that the endoglucosaminidase is in the correct intracellular position to modify the glycosylation of the glycoprotein.

Glycoprotein-Conjugates

In a particular embodiment the invention provides glycoprotein-conjugates. In a preferred embodiment the glycoproteins according to the invention are coupled to a specific moiety (a conjugated moiety as defined herein before) via the sialyl-LacNAc N-glycan structures present on the glycoproteins produced according to the invention. Such glycan specific coupling to a specific glycan moiety is referred to in the art as glycan-specific conjugation. Glycan structures with specific sialyl-LacNAc terminal carbohydrates as herein described before present on the glycoproteins are used as a starting point for the coupling with a specific moiety.

In the present invention "a glycoprotein of the invention" is a glycoprotein comprising N-glycans of which the sialyl-LacNAc glycan is present at more than 39%, more than 40%, more than 50% or even more than 60% of the total amount of N-glycans present on said glycoprotein.

Specific Moieties which can be Used for Conjugation

A plethora of conjugated moieties exist in the art which can be used for coupling to the sialyl-LacNAc N-glycan structure present on the glycoproteins of the invention. Conjugated moieties comprise for example a half-life extending moiety, a therapeutic agent, a detection unit, a targeting moiety or even a second (the same or different) glycoprotein. One or more conjugated moieties, which can also be different from each other, can be linked to the glycoprotein of the invention. Even one conjugated moiety can have more than one function, i.e. a half-life extending moiety can at the same time be useful as a targeting moiety.

i) Half-Life Extending Moieties

Various half-life extending moieties are envisaged herein. Non-limiting and in brief, reference is made to the half-life extension strategies described in Kontermann, R. E., Expert Opin Biol Ther. 16(7), 2016 or van Witteloostuijn, S. B., Chem Med Chem. 11(22), 2016. In particular, a variety of half-life extension techniques relying on covalent chemical modification have been developed. These methods include PEGylation, fusion to unstructured polypeptide-based PEG mimetics, employment of polysialylation (e.g. enzymatic use of polysialyltransferase enzymes), biotin-coupling, polyoxazoline-coupling, conjugation with large polysaccharides, lipidation, fusion to albumin or the Fc domain of IgG, and derivatization with bio-orthogonal moieties that direct self-assembly.

ii) Therapeutic Moieties

In certain embodiments the conjugated moiety comprises various therapeutic agents including i.e. anti-inflammatory, anticancer, cytotoxic, anti-infective (e.g., anti-fungal, anti-bacterial, anti-parasitic, anti-viral, etc.), and anesthetic therapeutic agents. In specific embodiments the conjugated moiety is an enzyme capable of converting a prodrug which is converted into a toxic drug. A toxic agent (e.g. a toxin, a cytotoxic drug, a radionuclide) can also be suitable for therapeutic purposes and is particularly useful in cancer therapy. Hence, a specific example of a glycoprotein-conjugate is an antibody-drug-conjugate (ADC). In principal, every agent suitable for therapeutic purposes is envisaged herein. Therapeutic agents as described are typically small molecules or biologics, but therapeutic agents can also be of another origin what should be clear to the skilled person and the invention should not be limited thereto.

iii) Detection Moieties

In certain embodiments the conjugated moiety comprises a detection moiety. The term "detection moiety" or "detectable label" refers to any unit possessing a property or function which can be used for detection purposes, i.e. those selected from the group comprising a chromophore unit, fluorescent unit, phosphorescent unit, luminescent unit, light absorbing unit, radioactive unit, and transition metal isotope mass tag unit. Without being limiting, the detection moiety can be a small or a large molecule as should be clear to the skilled person.

Suitable fluorescent units are those known from the art of immunofluorescence technologies, e.g., flow cytometry or fluorescence microscopy. In these embodiments of the invention, the conjugate comprising the detection unit is detected by exciting the detection unit and detecting the resulting emission (photoluminescence). In this embodiment, the detection unit is preferably a fluorescent unit.

Useful fluorescent units might be protein-based, such as phycobiliproteins, polymeric, such as polyfluorenes, small organic molecule dyes, such as xanthenes, like fluorescein, or rhodamines, cyanines, oxazines, coumarins, acridines, oxadiazoles, pyrenes, pyrromethenes, or metallo-organic complexes, such as Ru, Eu, Pt complexes. Besides single molecule entities, clusters of fluorescent proteins or small organic molecule dyes, as well as nanoparticles, such as quantum dots, upconverting nanoparticles, gold nanoparticles, dyed polymer nanoparticles can also be used as fluorescent units.

Another group of photoluminescent detection units are phosphorescent units with time-delayed emission of light after excitation. Phosphorescent units include metallo-organic complexes, such as Pd, Pt, Tb, Eu complexes, or nanoparticles with incorporated phosphorescent pigments such as lanthanide doped $SrAl_2O_4$.

In another embodiment of the invention the conjugate comprising the detection unit is detected without prior excitation by irradiation. In this embodiment the detection unit can be a radioactive label. They may be in the form of radioisotope labelling by exchanging non-radioactive isotopes for their radioactive counterparts, such as tritium, $^{32}P$, $^{35}S$ or $^{14}C$, or introducing covalently bound labels, such as $^{125}I$, which is bound to tyrosine, $^{18}F$ within fluorodeoxyglucose, or metallo-organic complexes, i.e. $^{99}Tc$-DTPA.

In another embodiment the detection unit can cause chemiluminescence, i.e. horseradish peroxidase label in the presence of luminol.

In another embodiment of the invention the conjugate comprising the detection unit is not detected by radiation emission, but by absorption of UV, visible light, or NIR radiation. Suitable light-absorbing detection moieties are light absorbing dyes without fluorescence emission, such as small organic molecule quencher dyes like N-aryl rhodamines, azo dyes, and stilbenes.

In another embodiment, the light-absorbing detection unit can be irradiated by pulsed laser light, generating a photoacoustic signal.

In another embodiment of the invention the conjugate comprising the detection unit is detected by mass spectrometric detection of a transition metal isotope. Transition metal isotope mass tag labels might be introduced as covalently bound metallo-organic complexes or nanoparticle component. Known in the art are isotope tags of lanthanides and adjacent late transition elements.

iv) Targeting Moiety

In certain embodiments, the conjugated moiety comprises a targeting moiety. As used herein, the term "targeting moiety" refers to a conjugated moiety that binds to a target molecule. Small molecules or biologics can both be employed as a targeting moiety. Targeting moieties can comprise, without limitation, proteins, nucleotide sequences, lipids, other carbohydrates (e.g. specific glycans), and combinations thereof (e.g., glycoproteins, glycopeptides, and glycolipids). Any moiety which can bind to a target can be employed as a targeting moiety according to the invention.

Linkers Useful in the Glycoprotein-Conjugates

In certain embodiments the glycoprotein-conjugates comprise a linker between the N-glycan consisting of sialyl-LacNAc disaccharide and the targeting moiety. Certain linkers are more useful than others and the use of a specific linker will depend on the application. For example oximes and hydrazones, in particular derived from aliphatic aldehydes, show less stability over time in water or at lower pH. Aromatically stabilized structures can be more useful to stably link a glycan to a conjugated moiety. Such stabilized linkers are also within the scope of the present application, as they can limit adverse effects due to premature release of the conjugated moiety, particularly when the conjugated moiety is a toxic substance intended for killing of a tumor cell. Of particular interest are aromatically stabilized triazole linkers and sulfamide linkers. It is within common technical knowledge that increased stability of a conjugate can also result from reduced aggregation tendency of any of the moieties comprised within said conjugate. For the production of glycoprotein-conjugates with increased stability the reader is non-exclusively referred to WO2013036748, WO2014065661, WO2015057064 and WO2016053107 as well as to other patent applications filed by Synaffix B.V. explicitly mentioned herein.

In general, various linkers known in the art can be used to link the glycoprotein and the conjugated moiety according to the invention. As should be clear, cleavable and non-cleavable linkers can be employed to achieve the desired release profile. In general, the optimal combination of linker and conjugation chemistry must be uniquely tailored to correlate each unique facet: the IVD, the conjugated moiety, and the profile of the disease to be treated. For reviews on antibody-drug conjugates and linkers used herein see for example Jessica R. McCombs and Shawn C. Owen, AAPS J. 17(2), 2015 and Lu, J. et al., Int J Mol Sci. 17(4), 2016 as well as a recent review by Pillow, T. H., Pharm Pat Anal. 6(1), 2017 describing a novel quaternary ammonium salt linker useful in conjugates for the treatment of cancer and infectious diseases.

Still other suitable spacers or linkers will be clear to the skilled person, and may generally be any linker or spacer used in the art. In specific aspects the linkers or spacers are suitable for use in applications which are intended for pharmaceutical use. For example, a linker between the glycan and the moiety in the glycoprotein-conjugate may in certain aspects also be a suitable amino acid sequence, and in particular amino acid sequences of between 1 and 50, or more specifically, between 1 and 30 amino acid residues. Some examples of such amino acid sequences include Gly-Ser (GS) linkers, such as for example (GS)n or (GGGSS)n or (GSS)n, as described in WO 99/42077 and the $(G4S)_3$, $GS_{30}$, $GS_{15}$, $GS_9$ and $GS_7$ linkers described in the applications by Ablynx mentioned herein (see for example WO 06/040153 and WO 06/122825), as well as hinge-like regions, such as the hinge regions of naturally occurring heavy chain antibodies or similar sequences (such as described in WO 94/04678). Still other suitable linkers generally comprise organic compounds or polymers, in particular those suitable for use in polypeptides for pharmaceutical use. For instance, poly(ethyleneglycol) moieties have been used to link antibody domains, see for example WO 04/081026. It is encompassed within the scope of the invention that the length, the degree of flexibility and/or other properties of the linker may have some influence on the properties of the final glycoprotein-conjugate of the invention, including but not limited to the affinity, specificity or avidity for a specific target. Based on the disclosure herein, the skilled person will be able to determine the optimal linker for use in a specific glycoprotein of the invention, optionally after some limited routine experiments. For example, in multivalent glycoproteins of the invention that comprise building blocks, directed against a first and second target, the length and flexibility of the linker is preferably such that it allows each building block to bind to its cognate target. Again, based on the disclosure herein, the skilled person will be able to determine the optimal linker for use in a specific glycoprotein of the invention, optionally after some limited routine experiments. Finally, when two or more linkers are used in the glycoprotein of the invention, these linkers may be the same or different. Again, based on the disclosure herein, the skilled person will be able to determine the optimal linkers for use in a specific polypeptide of the invention, optionally after some limited routine experiments. In certain specific embodiments it is desirable to produce glycoprotein-conjugates with longer linkers including for example carbohydrates, which can provide the glycoprotein-conjugate with higher hydrophilicity and accordingly improved water-solubility. Glycoprotein-conjugates comprising linkers with more carbohydrates are thus also within the scope of the present application. Also, linkers modified with PEG or consisting of PEG can be useful to increase the hydrophilic properties of a glycoprotein-conjugate.

Coupling Methods to Link Specific Moieties to a Glycoprotein of the Invention

In yet another embodiment the invention provides methods to produce a glycoprotein-conjugate of the invention. Generally, such methods start by introducing an expression vector comprising a nucleotide sequence encoding a glycoprotein according to the invention in a suitable cell of choice, followed by expressing the glycoprotein for some time, purifying the glycoprotein and linking of a specific conjugated moiety to the purified glycoprotein. The coupling method itself is generally carried out in vitro.

Several possibilities exist in the art to link a specific conjugated moiety to a glycoprotein of the invention. Experimental methods for coupling are provided in the example section (examples 4 and 5) of the instant invention.

Applications of Glycoprotein-Conjugates of the Invention

In a particular embodiment, a glycoprotein-conjugate of the invention is used to modulate the circulation half-life or to increase the glycoprotein stability, for selective targeting, to modulate immunogenicity of the glycoprotein-conjugate or for detection purposes.

In yet another embodiment the glycoprotein-conjugates of the invention are used as a medicament.

In yet another embodiment the glycoprotein of the invention (not conjugated with any moiety) of the invention is used as a medicament.

With the wording "to modulate circulation half-life" it is meant that the half-life of the polypeptide (e.g. glycoprotein-conjugate) can be either increased or decreased. For some applications, it can be useful that the glycoprotein-conjugate of the invention remains in the bloodstream for a shorter time than polypeptides or conjugates lacking the specific properties of polypeptides or glycoprotein-conjugates as claimed. Often, prolonged half-life is aimed as many therapeutic molecules are smaller than the renal filtration threshold and are rapidly lost from the circulation thereby limiting their therapeutic potential. As a non-limiting example, albumin or other half-life extending moieties as referred to above can be used in a variety of ways known to the skilled practitioner to increase the circulatory half-life of such molecules.

With "selective targeting" it is meant that glycoprotein-conjugates of the invention can be useful to achieve an exclusive effect on the target of interest. An example of this is conventional chemotherapy where selective targeting of cancer cells without interacting with the normal body cells often fails. As a consequence thereof serious side effects are caused including organ damage resulting in impaired treatment with lower dose and ultimately low survival rates. Glycoprotein-conjugates of the invention, optionally comprising a targeting moiety, can be useful to overcome the disadvantages of conventional approaches not limited to cancer therapy.

Glycoprotein-conjugates of the invention are also provided for detection purposes, particularly when comprising a detection unit as explained before. Particularly, glycoprotein-conjugates of the invention are more prone for detection purposes than glycoproteins lacking the specific properties of the claimed glycoprotein-conjugates.

Thus, in a particular embodiment the glycoprotein-conjugates of the invention can also be used for diagnostic purposes.

In yet another embodiment the invention provides kits comprising glycoproteins of the present invention.

In yet another embodiment the invention provides kits comprising glycoprotein-conjugates of the present invention.

In another embodiment, a pharmaceutical composition is provided comprising a glycoprotein-conjugate as described before.

Therefore, the present invention includes pharmaceutical compositions that are comprised of a pharmaceutically acceptable carrier and a pharmaceutically effective amount of glycoprotein-conjugates of the invention and a pharmaceutically acceptable carrier. A pharmaceutically acceptable carrier is preferably a carrier that is relatively non-toxic and innocuous to a patient at concentrations consistent with effective activity of the active ingredient so that any side effects associated with the carrier do not vitiate the beneficial effects of the active ingredient. A pharmaceutically effective amount of polypeptides of the invention and a pharmaceutically acceptable carrier is preferably that amount which produces a result or exerts an influence on the particular condition being treated. The polypeptides of the invention and a pharmaceutically acceptable carrier can be administered with pharmaceutically acceptable carriers well known in the art using any effective conventional dosage form, including immediate, slow and timed-release preparations, and can be administered by any suitable route such as any of those commonly known to those of ordinary skill in the art. For therapy, the pharmaceutical composition of the invention can be administered to any patient in accordance with standard techniques. The administration can be by any appropriate mode, including orally, parenterally, topically, nasally, ophthalmologically, intrathecally, intracerebroventricularly, sublingually, rectally, vaginally, and the like. Still other techniques of formulation as nanotechnology and aerosol and inhalant are also within the scope of this invention. The dosage and frequency of administration will depend on the age, sex and condition of the patient, concurrent administration of other drugs, counter-indications and other parameters to be considered by the clinician.

The pharmaceutical composition of this invention can be lyophilized for storage and reconstituted in a suitable carrier prior to use.

When prepared as lyophilization or liquid, physiologically acceptable carrier, excipient, stabilizer need to be added into the pharmaceutical composition of the invention (Remington's Pharmaceutical Sciences 22th edition, Ed. Allen, Loyd V, Jr. (2012). The dosage and concentration of the carrier, excipient and stabilizer should be safe to the subject (human, mice and other mammals), including buffers such as phosphate, citrate, and other organic acid; antioxidant such as vitamin C, small polypeptide, protein such as serum albumin, gelatin or immunoglobulin; hydrophilic polymer such as PVP, amino acid such as amino acetate, glutamate, asparagine, arginine, lysine; glycose, disaccharide, and other carbohydrate such as glucose, mannose or dextrin, chelate agent such as EDTA, sugar alcohols such as mannitol, sorbitol; counterions such as Na+, and/or surfactant such as TWEEN™, PLURONICS™ or PEG and the like.

The preparation containing pharmaceutical composition of this invention should be sterilized before injection. This procedure can be done using sterile filtration membranes before or after lyophilization and reconstitution.

The pharmaceutical composition is usually filled in a container with sterile access port, such as an i.v. solution bottle with a cork. The cork can be penetrated by hypodermic needle.

Therefore, the present invention includes pharmaceutical compositions that are comprised of a pharmaceutically acceptable carrier and a pharmaceutically effective amount of polypeptides, nucleotide sequences and glycoprotein-conjugates of the invention and a pharmaceutically acceptable carrier. A pharmaceutically acceptable carrier is preferably a carrier that is relatively non-toxic and innocuous to a patient at concentrations consistent with effective activity of the active ingredient so that any side effects ascribable to the carrier do not vitiate the beneficial effects of the active ingredient. A pharmaceutically effective amount of polypeptides, nucleotide sequences and conjugates of the invention and a pharmaceutically acceptable carrier is preferably that amount which produces a result or exerts an influence on the particular condition being treated. The polypeptides, nucleotide sequences and conjugates of the invention and a pharmaceutically acceptable carrier can be administered with pharmaceutically acceptable carriers well known in the art using any effective conventional dosage form, including immediate, slow and timed release preparations, and can be administered by any suitable route such as any of those commonly known to those of ordinary skill in the art. For therapy, the pharmaceutical composition of the invention can be administered to any patient in accordance with standard techniques. The administration can be by any appropriate mode, including orally, parenterally, topically, nasally, ophthalmologically, intrathecally, intracerebroventricularly, sublingually, rectally, vaginally, and the like. Still other techniques of formulation as nanotechnology and aerosol and inhalant are also within the scope of this invention. The dosage and frequency of administration will depend on the age, sex and condition of the patient, concurrent administration of other drugs, counter-indications and other parameters to be taken into account by the clinician.

The pharmaceutical composition of this invention can be lyophilized for storage and reconstituted in a suitable carrier prior to use.

When prepared as lyophilization or liquid, physiologically acceptable carrier, excipient, stabilizer need to be added into the pharmaceutical composition of the invention (Remington's Pharmaceutical Sciences 22th edition, Ed. Allen, Loyd V, Jr. (2012). The dosage and concentration of the carrier, excipient and stabilizer should be safe to the subject (human, mice and other mammals), including buffers such as phosphate, citrate, and other organic acid; antioxidant such as vitamin C, small polypeptide, protein such as serum albumin, gelatin or immunoglobulin; hydrophilic polymer such as PVP, amino acid such as amino acetate, glutamate, asparagine, arginine, lysine; glycose, disaccharide, and other carbohydrate such as glucose, mannose or dextrin, chelate agent such as EDTA, sugar alcohols such as mannitol, sorbitol; counterions such as Na+, and/or surfactant such as TWEEN™, PLURONICS™ or PEG and the like.

The preparation containing pharmaceutical composition of this invention should be sterilized before injection. This procedure can be done using sterile filtration membranes before or after lyophilization and reconstitution.

In another embodiment, a pharmaceutical composition is provided comprising a polypeptide of the invention.

Therefore, the present invention includes pharmaceutical compositions that are comprised of a pharmaceutically acceptable carrier and a pharmaceutically effective amount of polypeptides of the invention and a pharmaceutically acceptable carrier. A pharmaceutically acceptable carrier is preferably a carrier that is relatively non-toxic and innocuous to a patient at concentrations consistent with effective activity of the active ingredient so that any side effects associated with the carrier do not vitiate the beneficial effects of the active ingredient. A pharmaceutically effective amount of polypeptides of the invention and a pharmaceutically acceptable carrier is preferably that amount which produces a result or exerts an influence on the particular condition being treated. The polypeptides of the invention and a pharmaceutically acceptable carrier can be administered with pharmaceutically acceptable carriers well known in the art using any effective conventional dosage form, including immediate, slow and timed release preparations, and can be administered by any suitable route such as any of those commonly known to those of ordinary skill in the art. For therapy, the pharmaceutical composition of the invention can be administered to any patient in accordance with standard techniques. The administration can be by any appropriate mode, including orally, parenterally, topically, nasally, ophthalmologically, intrathecally, intracerebroventricularly, sublingually, rectally, vaginally, and the like. Still other techniques of formulation as nanotechnology and aerosol and inhalant are also within the scope of this invention. The dosage and frequency of administration will depend on the age, sex and condition of the patient, concurrent administration of other drugs, counter-indications and other parameters to be considered by the clinician.

The pharmaceutical composition of this invention can be lyophilized for storage and reconstituted in a suitable carrier prior to use.

When prepared as lyophilization or liquid, physiologically acceptable carrier, excipient, stabilizer need to be added into the pharmaceutical composition of the invention (Remington's Pharmaceutical Sciences 22th edition, Ed. Allen, Loyd V, Jr. (2012). The dosage and concentration of the carrier, excipient and stabilizer should be safe to the subject (human, mice and other mammals), including buffers such as phosphate, citrate, and other organic acid; antioxidant such as vitamin C, small polypeptide, protein such as serum albumin, gelatin or immunoglobulin; hydrophilic polymer such as PVP, amino acid such as amino acetate, glutamate, asparagine, arginine, lysine; glycose, disaccharide, and other carbohydrate such as glucose, mannose or dextrin, chelate agent such as EDTA, sugar alcohols such as mannitol, sorbitol; counterions such as Na+, and/or surfactant such as TWEEN™, PLURONICS™ or PEG and the like.

The preparation containing pharmaceutical composition of this invention should be sterilized before injection. This procedure can be done using sterile filtration membranes before or after lyophilization and reconstitution.

The pharmaceutical composition is usually filled in a container with sterile access port, such as an i.v. solution bottle with a cork. The cork can be penetrated by hypodermic needle.

It is to be understood that although particular embodiments, specific configurations as well as materials and/or molecules, have been discussed herein for nucleotide sequences, cells, polypeptides, conjugates and methods according to the present invention, various changes or modifications in form and detail may be made without departing from the scope and spirit of this invention. The following examples are provided to better illustrate particular embodiments, and they should not be considered limiting the application. The application is limited only by the claims.

EXAMPLES

1. Optimizing Formation of N-Glycans Consisting of a Sialyl-LacNAc Trisaccharide in Higher Eukaryotic Cells Having a GlycoDelete Background Previously, we expressed a recombinant humanized monoclonal anti-CD20 antibody (Obinutuzumab) and a recombinant human GM-CSF protein in a higher eukaryotic GlycoDelete background (see Meuris et al (2014) *Nat. Biotechn.* 32, 5, 485). Analysis of the N-glycans present on the recombinant proteins showed that in the case of the monoclonal antibody about 30% terminal sialylation of the Fc N-linked glycan was obtained, whereas this percentage was much higher (about 75%) in the case of recombinant hGM-CSF. In the present experiment, our aim was to increase sialylation of the Fc N-linked glycans. It is known that the Fc N-linked glycans are partially sterically occluded within the Fc fold and therefore more difficult to engineer for higher sialylation levels. Briefly, expression vectors encoding human β-1,4-Galactosyltransferase (GalT), human α-2,6-Sialyltransferase (SialT) and a R263L mutated form of human UDP-N-acetylglucosamine-2-epimerase/N-acetylmannosamine kinase (GNE) were transiently co-transfected with an expression vector encoding the anti-CD20 antibody into HEK293 cells with a GlycoDelete background (see Meuris et al (2014) *Nat. Biotech.* 32, 5, 485). The glycosylation profile of the produced anti-CD20 antibodies was analyzed via LC-ESI-MS (See Table 1).

TABLE 1

Increase in sialylation of HEK293GlycoDelete-produced antibodies through transient co-expression of different enzymes (mutant form of GNE, beta-(1,4)-galactosyltransferase (GalT), alpha-2,6-sialyltransferase (SialT)) in the N-glycan sialylation pathway.

| Condition | % GlcNAc | % LacNAc | % Sialyl-LacNAc |
|---|---|---|---|
| GD-GalT | 29% | 15% | 56% |
| GD-SialT | 8% | 58% | 34% |
| GD-GNE | 10% | 36% | 54% |
| GD-Control | 15% | 51% | 34% |

GD: GlycoDelete background.

Our data show that the overexpression of GalT or mutant GNE can boost sialylation of the GlycoDelete N-linked glycan on the difficult-to-access Fc site to ±55%.

2. Expression of a GFP-Binding Nanobody, with an Artificially Introduced N-Glycosylation Site, in a GlycoDelete Engineered HEK293 Cell Line Comprising a Mutant UDP-N-Acetylglucosamine-2-Epimerase/N-Acetylmannosamine Kinase (GNE) which is Insensitive to CMP-Neu5Ac Feedback Inhibition A glyco-engineered GFP-binding nanobody (GBP_R86N) was selected as a benchmark protein. This protein was obtained by introducing a point mutation (mutation R86N (aHo numbering) to introduce an artificial N-glycosylation site) in the wild type GFP-binding nanobody (GBP; published by Kubala, M. H. et al (2010) *Protein Sci.* 19(12)). The amino acid sequence of the wild type GBP nanobody is depicted in SEQ ID NO: 1. In SEQ ID NO: 1 the CDR1, CDR2 and CDR3 regions are underlined.

(121 amino acids) SEQ ID NO 1:
QVQLVESGGALVQPGGSLRLSCAASGFPVNRYSMRWYRQAPGKEREWVAG

MSSAGDRSSYEDSVKGRFTISRDDARNTVYLQMNSLKPEDTAVYYCNVNV

GFEYWGQGTQVTVSSHHHHHH

An expression vector was made wherein the coding sequence of the GBP_R86N nanobody (with artificially introduced N-glycosylation acceptor site) is operably linked to the CMV promoter. The resulting expression vector was transiently transfected into a standard GlycoDelete-engineered HEK293 cell line and in a GlycoDelete-engineered HEK293 cell line that also contains a mutant UDP-N-acetylglucosamine-2-epimerase/N-acetylmannosamine kinase (GNE) which is insensitive to CMP-Neu5Ac feedback inhibition. Transfected cells were grown for 72 h at 37° C., after which the culture medium was collected. The glycosylation profile of the produced GBP_R86N nanobody was analyzed via LC-ESI-MS and the amount of sialyl-LacNAc N-glycans was evaluated.

TABLE 2

Percentages of glycosylated GBP_R86N that have LacNAc or sialyl-LacNAc on the N-glycosylation site upon transient expression of GBP_R86N in standard GlycoDelete cells and GlycoDelete cells comprising of a mutant form of GNE.

| Condition | % LacNAc | % sialyl-LacNAc |
|---|---|---|
| GlycoDelete | 8 | 27 |
| GlycoDelete_GNE_mut | 2 | 35 |

3. Expression of Therapeutic IgG1 Antibodies in a GlycoDelete Engineered HEK293 Cell Line Comprising a Mutant UDP-N-Acetylglucosamine-2-Epimerase/N-Acetylmannosamine Kinase (GNE) which is Insensitive to CMP-Neu5Ac Feedback Inhibition We expressed adalimumab, a TNF-specific IgG1 antibody, and an α4-integrin binding IgG1 antibody in a standard GlycoDelete-engineered HEK293 cell line and in a GlycoDelete-engineered HEK293 cell line that also contains a mutant UDP-N-acetylglucosamine-2-epimerase/N-acetylmannosamine kinase (GNE) which is insensitive to CMP-Neu5Ac feedback inhibition. Transfected cells were grown for 72 h at 37° C., after which the culture medium was collected. The glycosylation profile of the produced antibodies was analyzed via LC-ESI-MS and the amount of sialyl-LacNAc N-glycans was evaluated.

Adalimumab

TABLE 2

Percentages of glycosylated Adalimumab that have GlcNAc, LacNAc or Sialyl-LacNAc on the N-glycosylation site upon transient expression of Adalimumab in standard GlycoDelete cells (GD) and Glycodelete cells comprising a mutant form of GNE (SiaHigh).

|  | GD | SiaHigh |
| --- | --- | --- |
| % GlcNAc | 11.47766 | 18.25445 |
| % LacNAc | 57.87053 | 41.82155 |
| % Sialyl-LacNAc | 30.65181 | 39.924 |

α4-Integrin Binding IgG1

TABLE 3

Percentages of gycosylated α4-integrin binding IgG1 that have GlcNAc, LacNAc or Sialyl-LacNAc on the N-glycosylation site upon transient expression of α4-integrin binding IgG1 in standard GlycoDelete cells (GD) and Glycodelete cells comprising a mutant form of GNE (SiaHigh).

|  | GD | SiaHigh |
| --- | --- | --- |
| % GlcNAc | 6.029776 | 20.3815 |
| % LacNAc | 69.76478 | 38.1564 |
| % Sialyl-LacNAc | 24.20544 | 41.4621 |

4. Development of Sialyl-LacNAc Glycan-Specific Conjugation Methods

The data from the previous examples convincingly show that homogeneous forms of sialyl-LacNAc N-glycans can be produced on glycoproteins expressed in eukaryotic cells of the invention comprising a mutant GNE enzyme. These data pave the way for glycan-based conjugation strategies of glycoproteins. In the following example we are using nanobodies with simple and homogeneous N-glycans introduced in an artificially engineered N-glycosylation site as outlined in Example 2 for the application of glycan-specific conjugation methods. The homogeneous sialyl-LacNAc N-glycans provide for a bio-orthogonal handle on the protein that can be used for coupling to a wide variety of desired moieties—e.g. PEG chains, chelators, toxic drugs etc. The glycan-based conjugation chemistry is evaluated/optimized using commercially available PEG as exemplified in example 5.

5. Conjugation Strategies

In this example we show how a nanobody with an artificially introduced N-glycan at position 86 (Aho numbering) can be specifically modified with PEG-biotin on the glycan. The nanobody is first recombinantly expressed in a HEK293 GlycoDelete cell (see WO2010015722) or a HEK293 GlycoDoubleDelete cell (see WO2017005925), engineered to produce maximum amounts of the sialyl-LacNAc type N-glycan (as opposed to GlcNAc and LacNAc type N-glycans), said cell being defined in claim 1. Glycoproteins comprising homogeneous forms of sialyl-LacNAc N-glycans yield homogeneous and pure conjugated products in glycan-based conjugation (in contrast to the more heterogeneous situation for wild type glycans).

Figure 1:
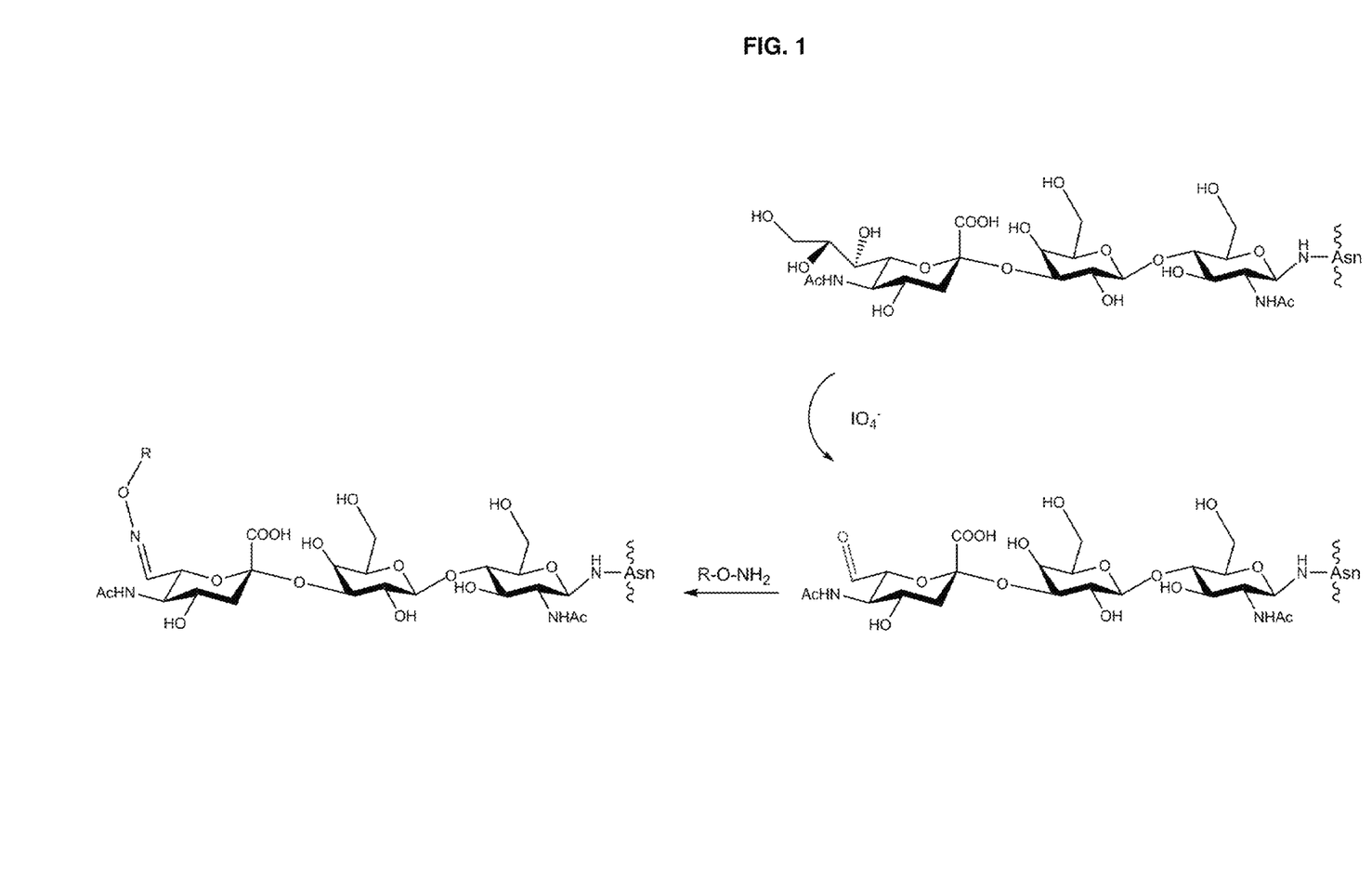
FIG. 1: Schematic view of sialyl-LacNAc-based periodate oxidation. The vicinal diols in sialic acid, the terminal residue of the sialyl-LacNAc (GlcNAc-Gal-Sia) GlycoDelete N-glycan, are selectively oxidized using periodate, yielding a free aldehyde group. This free aldehyde can react with aminooxy-containing molecules to form stable oxime bonds. R is a molecule of interest, such as a PEG chain or toxin.

The vicinal diol(s) in glycans can be oxidized using sodium periodate ($NaIO_4$). Early versions of this chemistry have been in use for decades, e.g. to generate fluorescently labeled antibodies. Glyco-engineered nanobodies obtained via the GlycoDelete technology carry glycans on which periodate oxidation yields pure products (in contrast to the situation of wild type glycans). The LacNAc type glycans (GlcNAc-Gal) contain a single vicinal 'cis' diol in the galactose residue (at the C3 and C4 ring positions) which can be oxidized. The sialyl-LacNAc type glycans contain, in addition to the vicinal cis diol in the galactose residue, vicinal diols in the glycerol side chain of the terminal sialic acid residue that are susceptible to periodate oxidation. The vicinal diols in sialic acid are much more easily oxidized by periodate than galactose, allowing the use of mild oxidation conditions favouring sialic acid oxidation while still retaining product homogeneity. Periodate oxidation of the vicinal diols present in the glycan creates free aldehyde groups, which can readily react with aminooxy-containing molecules to form oximes, which are immediately stable in water. Alternatively, the free aldehydes can be reacted with hydrazine-containing molecules to form a stable hydrazone linkage, or they can be linked to amine-containing molecules via reductive amination. The sialyl-LacNAc glycans conjugated in this manner retain an intact GlcNAc residue directly linked to the protein asparagine, which is favourable in terms of conjugate degradability in the lysosome. The schematic outline of sialyl-LacNAc-based periodate oxidation, coupled with subsequent oxime ligation, is illustrated in FIG. 1.

Figure 2:
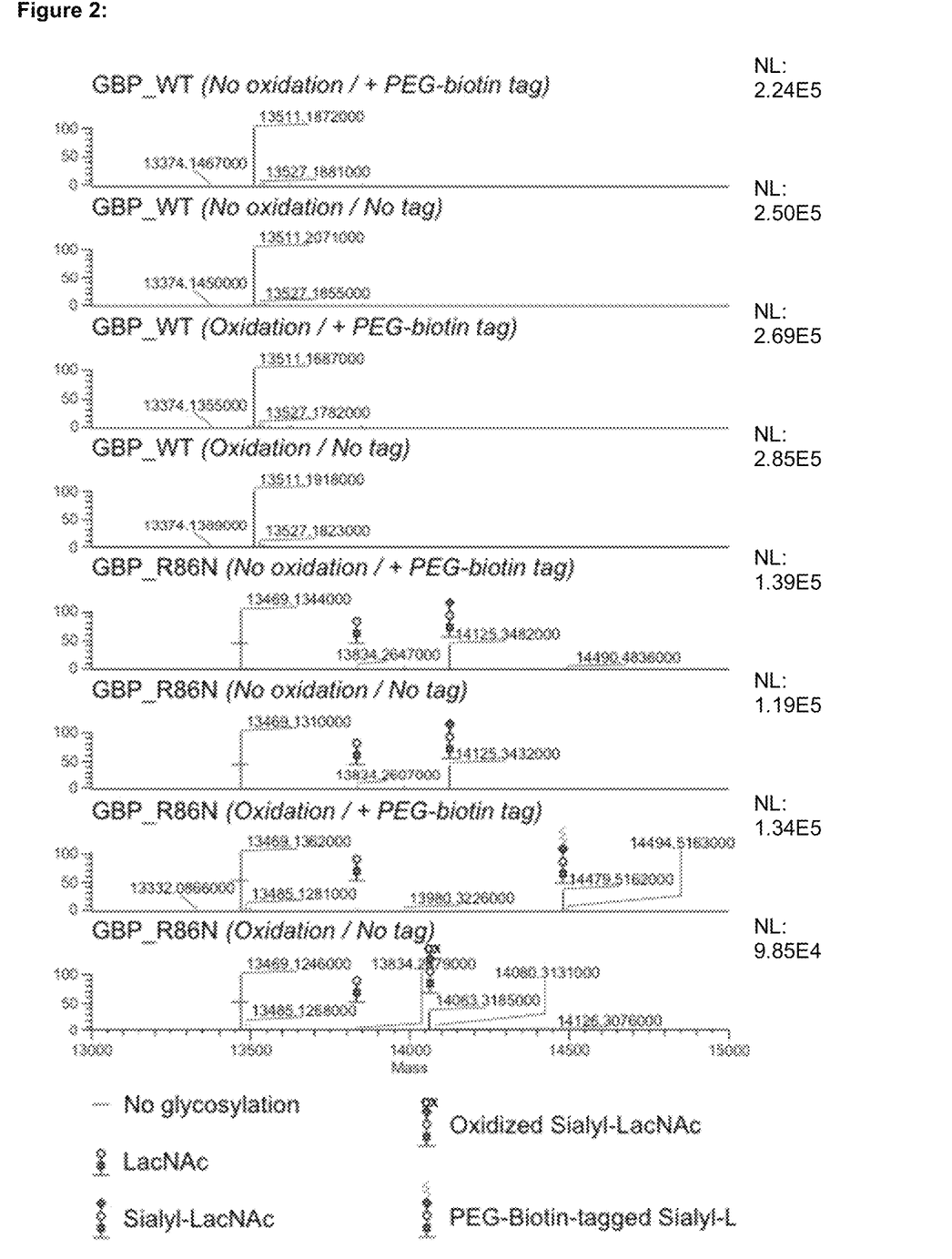
FIG. 2: GBP_R86N (1 N-linked glycosylation site) was recombinantly produced in HEK293sGlycoDelete cells and purified, yielding a mixture of non-glycosylated protein and protein carrying a GlcNAc, LacNAc, or sialyl-LacNAc N-glycan. GBP_WT (no N-linked glycosylation sites) was produced and purified for use as a control. The purified protein was then oxidized with periodate (mock treatment as a control) and linked to a short biotinylated and aminooxy-modified PEG tag (no tag as a control) via oxime ligation. Mass spec analysis showed that the PEG tag was selectively linked to sialyl-LacNAc-carrying GBP_R86N.
Figure 3:
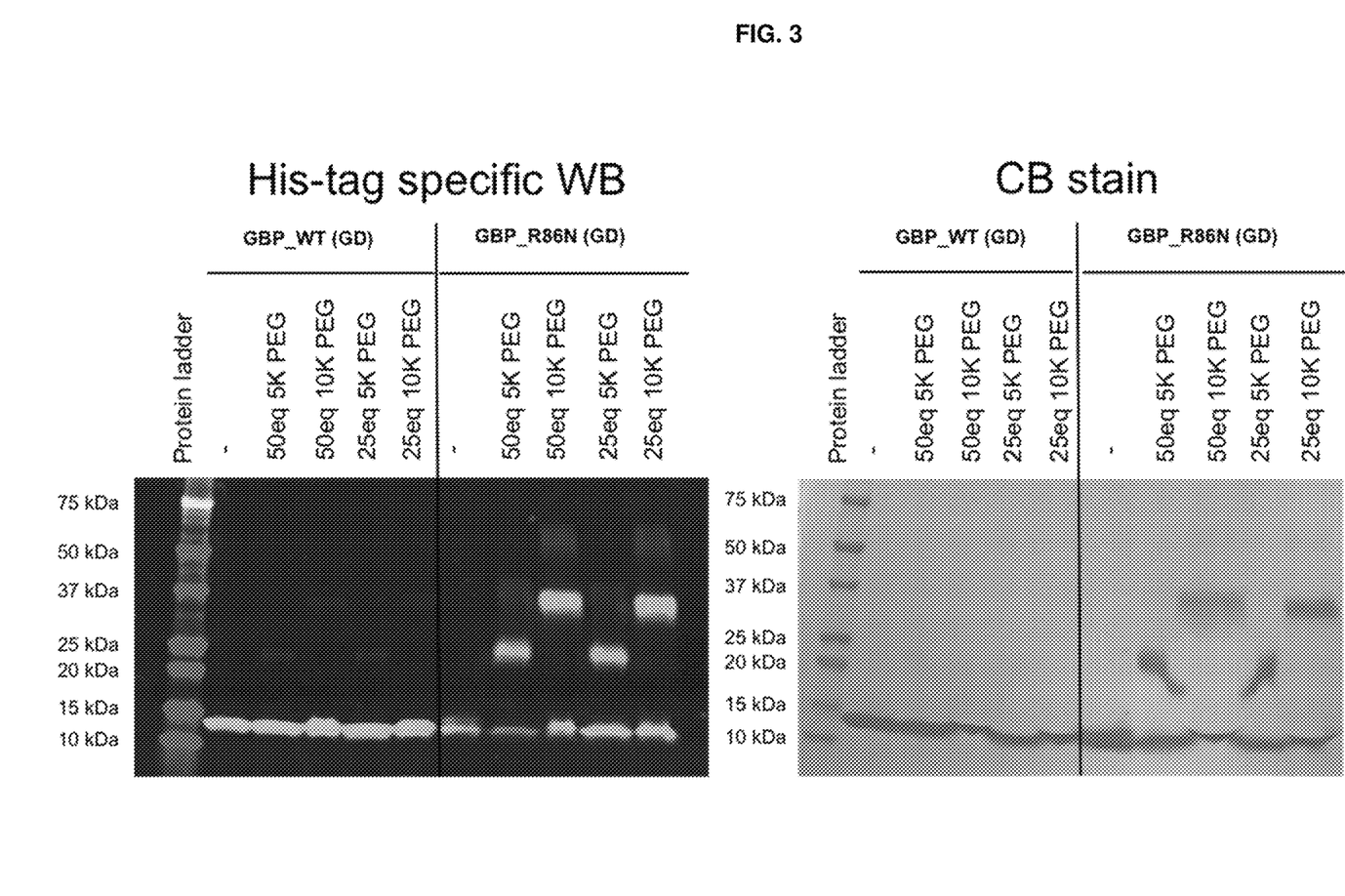
FIG. 3: GBP_WT (no N-linked glycosylation sites) and GBP_R86N (1 N-linked glycosylation site) were recombinantly produced in HEK293sGlycoDelete cells. Proteins were purified, yielding a mixture of non-glycosylated protein and protein carrying a GlcNAc, LacNAc, or sialyl-LacNAc N-glycan. The purified protein was then oxidized with periodate and linked to a 5 kDa (5K) or 10 kDa (10K) aminooxy-modified PEG chain (25- or 50-fold molar excess; no PEG chain as a control) via oxime ligation. Samples were analyzed via His-tag specific western blot and Coomassie Blue stain.

Briefly, GBP carrying a R86N mutation (1 N-linked glycosylation site) was recombinantly produced in HEK293 GlycoDelete cells and purified, yielding a mixture of non-glycosylated protein and protein carrying either a single GlcNac, LacNAc or sialyl-LacNAc N-glycan. GBP_WT (no N-linked glycosylation sites) was produced and purified for use as a control. The purified protein was then subjected to mild periodate oxidation (mock treatment as a control) and subsequent oxime ligation to a short biotinylated and aminooxy-modified PEG tag (no tag as a control). Mass spec analysis showed that the PEG tag was selectively linked to sialyl-LacNAc-carrying GBP (see FIG. 2). In a similar experiment, purified protein was subjected to mild periodate oxidation and subsequent oxime ligation to a 5 or 10 kDa aminooxy-modified PEG chain (no PEG chain as a control). His-tag-specific Western blot analysis and Coomassie Blue stain showed that the PEG chains were selectively linked to the glycosylated GBP; non-glycosylated GBP showed no appreciable conjugation to the aminooxy-modified PEG chains (see FIG. 3).

Azide-modified sialyl-LacNAc glycans may also be obtained by feeding azide-modified monosaccharide precursors (AzSia) to the GlycoDelete cells producing the protein of interest; this allows subsequent site-specific functionalization via click chemistry.

The invention claimed is:

1. A mammalian cell comprising:
   a first exogenous nucleic acid sequence encoding an endoglucosaminidase enzyme, wherein the endoglucosaminidase enzyme is operably linked to a secretion signal or is operably linked to an ER or Golgi localization signal;
   a second nucleic acid sequence encoding a mutant UDP-N-acetylglucosamine-2-epimerase/N-acetylmannosamine kinase which is insensitive to CMP-Neu5Ac feedback inhibition; and
   a third exogenous nucleic acid sequence encoding a Fc containing molecule;
   wherein the Fc containing molecules produced by the cell have at least a 30% increase in sialyl-LacNAc N-glycans as compared to otherwise identical cells lacking the second nucleic acid.

2. The mammalian cell of claim 1, wherein the mammalian cell further comprises a nucleic acid sequence encoding a beta-(1,4)-galactosyltransferase, wherein the beta-(1,4)-galactosyltransferase is operably linked to an ER or Golgi localization signal.

3. The mammalian cell of claim 1, wherein the mammalian cell lacks ER-mannosidase I, glucosidase I, glucosidase II, N-acetylglucosaminyl transferase I, N-acetylglucosaminyl transferase II or mannosidase II enzymatic activity.

4. The mammalian cell of claim 1, wherein the mammalian cell further comprises an exogenous nucleic acid sequence encoding an alfa-2,3-sialyltransferase, wherein the alfa-2,3-sialyltransferase is operably linked to an ER or Golgi localization signal and/or an alfa-2,6 sialyltransferase, wherein the alfa-2,6-sialyltransferase is operably linked to an ER or Golgi localization signal.

5. The mammalian cell of claim 1, wherein the mammalian cell is deficient in UDP-Glc-4-epimerase activity.

6. The mammalian cell of claim 1, wherein the mammalian cell further comprises an exogenous nucleic acid sequence encoding an UDP-Glc-4-epimerase.

7. A method of producing a sialylated or polysialylated glycoprotein, the method comprising:
   producing a sialylated or polysialylated glycoprotein from the mammalian cell of claim 1.

8. The mammalian cell of claim 1, wherein the mammalian cell is a human cell.

* * * * *

SEQUENCE LISTING

```
<160> NUMBER OF SEQ ID NOS: 2

<210> SEQ ID NO 1
<211> LENGTH: 121
<212> TYPE: PRT
<213> ORGANISM: Lama glama

<400> SEQUENCE: 1

Gln Val Gln Leu Val Glu Ser Gly Gly Ala Leu Val Gln Pro Gly Gly
1               5                   10                  15

Ser Leu Arg Leu Ser Cys Ala Ala Ser Gly Phe Pro Val Asn Arg Tyr
            20                  25                  30

Ser Met Arg Trp Tyr Arg Gln Ala Pro Gly Lys Glu Arg Glu Trp Val
        35                  40                  45

Ala Gly Met Ser Ser Ala Gly Asp Arg Ser Ser Tyr Glu Asp Ser Val
    50                  55                  60

Lys Gly Arg Phe Thr Ile Ser Arg Asp Asp Ala Arg Asn Thr Val Tyr
65                  70                  75                  80

Leu Gln Met Asn Ser Leu Lys Pro Glu Asp Thr Ala Val Tyr Tyr Cys
                85                  90                  95

Asn Val Asn Val Gly Phe Glu Tyr Trp Gly Gln Gly Thr Gln Val Thr
            100                 105                 110

Val Ser Ser His His His His His His
        115                 120

<210> SEQ ID NO 2
<211> LENGTH: 5
<212> TYPE: PRT
<213> ORGANISM: Artificial Sequence
<220> FEATURE:
<223> OTHER INFORMATION: Linker

<400> SEQUENCE: 2

Gly Gly Gly Ser Ser
1               5
```